US012659407B1

(12) United States Patent
Mishra et al.

(10) Patent No.: US 12,659,407 B1
(45) Date of Patent: Jun. 16, 2026

(54) SERVICE LEVEL BASED ROUTING USING SKIP PROBABILITIES

(71) Applicant: Amazon Technologies, Inc., Seattle, WA (US)

(72) Inventors: Sonu Kumar Mishra, Seattle, WA (US); Vamsi Polapragada, Redmond, WA (US); Juliana Saussy, Woodland Hills, CA (US); Preetham Gowda, Sammamish, WA (US); Jon Russell Jay, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 18/217,367

(22) Filed: Jun. 30, 2023

(51) Int. Cl.
| | |
|---|---|
| *H04M 3/523* | (2006.01) |
| *G06Q 10/0631* | (2023.01) |
| *G06Q 30/015* | (2023.01) |

(52) U.S. Cl.
CPC .... *H04M 3/5238* (2013.01); *G06Q 10/06311* (2013.01); *G06Q 30/015* (2023.01)

(58) Field of Classification Search
None
See application file for complete search history.

(56) References Cited

U.S. PATENT DOCUMENTS

| | | | |
|---|---|---|---|
| 6,347,139 B1 * | 2/2002 | Fisher ................. | H04M 3/5233 379/266.03 |
| 8,423,662 B1 | 4/2013 | Weihl et al. | |

| | | | |
|---|---|---|---|
| 10,735,339 B1 | 8/2020 | Matthews et al. | |
| 10,880,202 B2 * | 12/2020 | Wu ....................... | H04L 1/0076 |
| 11,075,847 B1 | 7/2021 | Kwan et al. | |
| 11,805,067 B1 | 10/2023 | Balasubramanian et al. | |
| 2003/0174830 A1 | 9/2003 | Boyer et al. | |
| 2015/0023490 A1 | 1/2015 | Jay et al. | |
| 2015/0230126 A1 | 8/2015 | Raleigh et al. | |
| 2016/0065422 A1 | 3/2016 | Khargharia et al. | |
| 2017/0118341 A1 | 4/2017 | Kelly et al. | |
| 2017/0236176 A1 | 8/2017 | Johansson et al. | |
| 2017/0289048 A1 * | 10/2017 | Chao ....................... | H04L 43/14 |

(Continued)

OTHER PUBLICATIONS

USPTO Notice of Allowance dated Feb. 27, 2025, U.S. Appl. No. 18/217,370, 11 pages.

(Continued)

*Primary Examiner* — Quynh H Nguyen
(74) *Attorney, Agent, or Firm* — Davis Wright Tremaine LLP

(57) ABSTRACT

Systems and methos are described relating to distributing agents to different queues provided by a contact service. The contact service may define a number of different queues for processing different customer requests, such as may be routed to different agents, with each queue associated with a priority value (higher priority get assigned agents first) and a visibility threshold (how long a request will sit before it is picked up by an agent). The described techniques add a time-to-service level (SL) goal, per queue to determine when queues are over and underperforming. In the case queues are overperforming, various techniques, such as control systems techniques, may be used to determine probabilities by which agents can skip being 10 assigned to the over performing queues, to be assigned to lower priority underperforming queues, to increase meeting the customer SL goals.

20 Claims, 12 Drawing Sheets

(56)     References Cited

U.S. PATENT DOCUMENTS

| | | |
|---|---|---|
| 2017/0332282 A1 | 11/2017 | Dao |
| 2018/0176374 A1 | 6/2018 | Agarwa et al. |
| 2019/0130327 A1 | 5/2019 | Carpenter et al. |
| 2020/0074363 A1 | 3/2020 | Chan et al. |
| 2021/0092231 A1 | 3/2021 | Wu et al. |
| 2022/0407808 A1 | 12/2022 | Chen et al. |

OTHER PUBLICATIONS

USPTO Office Action dated Oct. 21, 2024, U.S. Appl. No. 18/217,370, 22 pages.

* cited by examiner

500

SERVICE LEVEL BASED ROUTING USING SKIP PROBABILiTIES

BACKGROUND

The use of contact centers, to route different communications channels, including text, audio, and video, to customer service agents is increasing rapidly. Typically, these contact centers provide for various routing configurations or routing profiles to provide better customer service by connecting customers with agents qualified to handle certain types of requests and in a timely manner. Different queues may be used, such as having different priority levels, to help facilitate prioritizing different types of requests, which may be staffed by any number of agents. Currently, contact center administrators manually configure routing profiles that become complex as their contact center grows. As a result, contact centers end up with thousands of queues and routing profiles, staffed by tens of thousands of agents. Managing this configuration manually is not only error prone and inefficient, but also costly, requiring several a large number of administrators to actively monitor and manage these configurations, making it impossible for large contact centers to achieve accuracy.

BRIEF DESCRIPTION OF THE DRAWINGS

Various techniques will be described with reference to the drawings, in which.

DETAILED DESCRIPTION

Figure 1A:
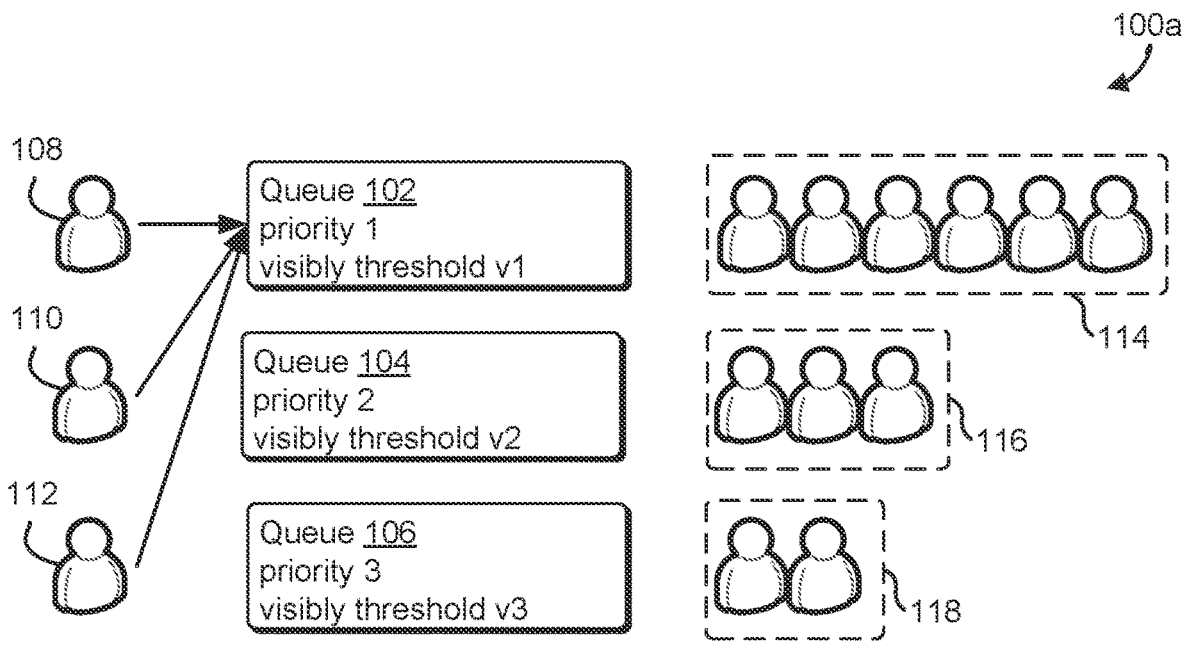
FIGS. 1A and 1B illustrate two examples of agent routing to different queues, s may be provided by a contact service, according to at least one embodiment.

Systems and methods are described herein for improving resource allocations to different queues provided by a contact service. In some aspects, various requests may be received by a contact service, whereby the contact service allocates those requests to different queues according to different contact flows, whereby resources or agents are assigned to process requests in the various queues based on routing rules or profiles. The described techniques utilize different processes to better allocate or assign agents to different queues. In various cases, a routing profile may define a number of different queues for which requests may be distributed, a number of different channels (e.g., voice, chat, or task) supported by the queue, and various skillsets of qualifications for processing requests in a given queue (e.g., a skillset of an agent responding to the request. Each queue may be associated with one or more of a priority (e.g., which queue gets an agent assignment first), a visibility threshold or delay (e.g., in seconds to minutes), which may define how long a request can sit in the queue before it is assigned to an agent, and a time-to-service level (SL) goal, which may be defined by an administrator or user, and may specify a percentage of requests in a queue and an acceptable time to which to process that percentage of requests in a given queue (e.g., seconds to minutes).

In some aspect, the described techniques may include associating a probability value to different queues, which may be exceeding their respective SL goals, by which an agent may skip taking a request from a given queue and move on to the next lower priority queue, to in effect override the relative priority value associated with the queue. This may be useful to help improve the performance of (e.g., decrease the time to process requests in) lower priority queues. In some cases, various techniques may be utilized to determine the probability values. In some cases, a control systems approach may be utilized, to dynamically determine the probability values for different queues, such as using a controller or algorithm that takes into account a proportional, integral, and/or derivative gains (e.g., a P, PI, or PID controller). In other cases, an additive increase multiplicative decrease (AIMD) controller or similar approach may be used to determine the probability values.

In other aspects, the described techniques may include adjusting the visibility threshold of over and/or underperforming queues to help improve the performance of lower priority queues. In some cases, various techniques may be utilized to determine how much to reduce the visibility thresholds of various queues. In some cases, a control systems approach may be utilized, to dynamically determine the amounts for different queues, such as using a controller that takes into account a proportional, integral, and/or derivative gains (e.g., a P, PI, or PID controller). In other cases, an additive increase multiplicative decrease (AIMD) controller or similar approach may be used to determine the adjustments to the visibility thresholds. In some instances, visibility thresholds may be adjusted to approximate or equal the time-to-service level goal corresponding to the queue to respond to some type of overload condition. In some cases, various safety margins may be accounted for in either or both approaches to ensure that through the queue modifications, a given queue that is over performing initially is not modified to be underperforming.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) more efficient utilization of computing resources in allocating resources to process requests in different queues; (2) reduction in wait times for resources to be allocated to process requests in a variety of queues; and (3) other benefits and advantages as will be described and made apparent in the description below.

Figure 1B:
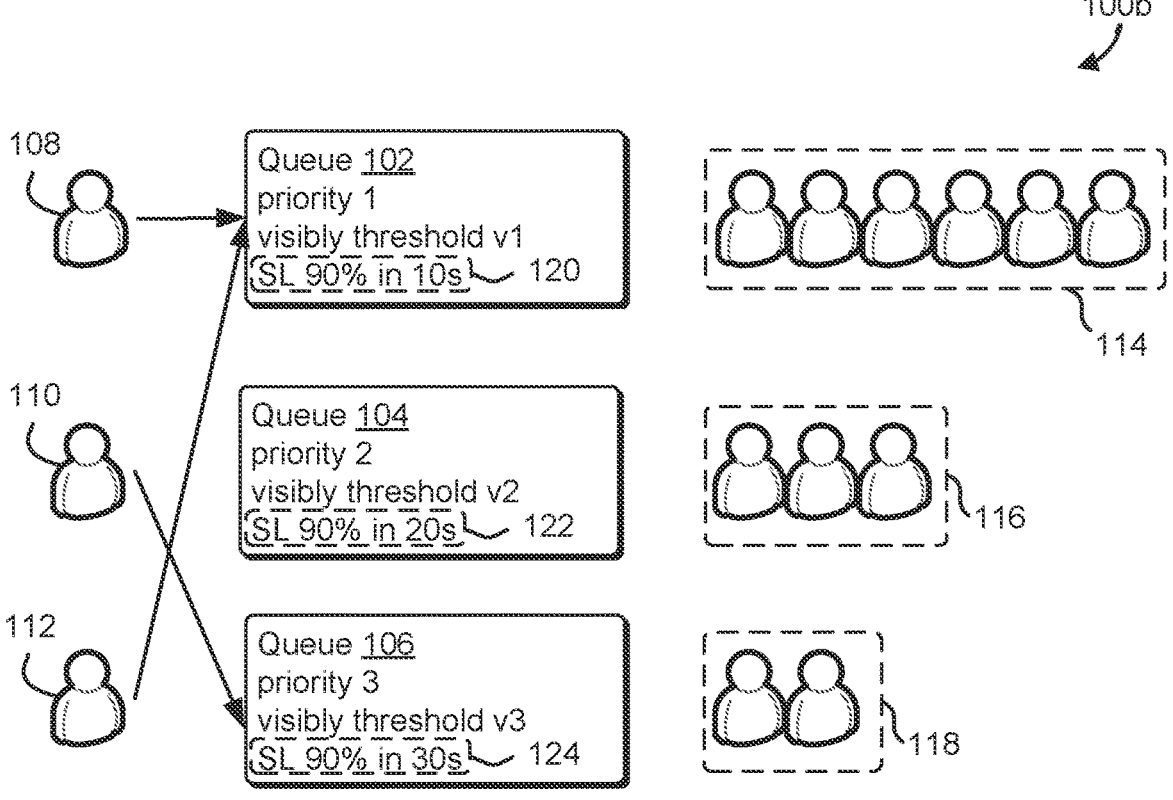

FIGS. 1A and 1B illustrate two examples 100a and 100b of agents or resources be assigned to process requests in different queues, such as of a contact service. As illustrated in diagram 100a, three different queues, 102, 104, 106, may be provided by a contact service, which may provide for various routing and other functionality to connect agents with various skill sets with customers who have various requests (e.g., returns, questions about a service, troubleshooting, etc.). Various customers may be waiting to connect with an agent, as illustrated by customers 114, 1116, and 118 for queues 102, 104, 106, respectively. As used herein, a customer waiting to connect with an agent, or various other types of requests, will generally be referred to as a request. Each queue 102, 104, 106 may be associated with a priority value, such as 1, 2, 3, etc., which may define an order by which requests are processed between the different queues. For example, a queue with a priority of 1, such as queue 102, may receive more agent assignments, such as agents 108, 110, 112, before a queue with a lower priority, such as queue 104 with a priority of 2, and queue 106 with a priority of 3. Priority may be used to process certain types of requests more quickly, such as new sales, etc.

As also illustrated, each queue may be configured with a visibility threshold, which may define a time (e.g., in seconds), that a request is to sit in the queue before it is seen and assignable or can be picked up and processed by an agent. As illustrated, queue 102 has a visibility threshold v1, queue 104 v2, and queue 3 v3. As illustrated in diagram 100*a*, queue 102 may be allocated all of the agents 108, 110, 112, such that requests in queue 104 and queue 106 may be under performing, or not having requests processed in a timely manner.

In some cases, a contact center may have a routing profile with multiple queues in it at different priorities. In a certain scenario in which the incoming traffic in a higher priority queue is high, the contacts in the lower priority queues start facing increased wait times. This can even lead to a skewness in the performance of queues: there are some queues that are underperforming and some queues that are overperforming with respect to the queues SL goal. Generally, the solution to such problems is that the contact center administrator can temporarily divide the routing profile into multiple smaller routing profiles and have some agents handle only the low priority queues. This has many disadvantages, such as 1) it is not scalable for big contact centers that have hundreds of routing profiles and thousands of queues, 2) as the traffic patterns change multiple times during a day, these manual actions have to be repeated, and 3) it is hard under dynamic traffic scenarios to exactly estimate how many agents should be reserved for each queue. Manual actions are error prone potentially adversely impacting the high priority end-customers.

In some aspects, using the techniques described herein, a set of queues can be defined to have an additional queue-level time-to-service level (SL) goal, which may indicate a time in which a request is to be processed/assigned. Diagram 100*b* illustrates a similar set of queues 102, 104, 106, but each having a different SL goal, such as queue 102 having an SL goal 120 of 90% within 10 seconds, queue 104 having an SL goal 122 of 90% in 20 seconds, and queue 106 having an SL goal 124 of 90% in 30 seconds. Using SL goals as input data, the described techniques can dynamically apportion agents to optimize the application of resources (agents). In some aspects, this may improve performance and eliminate errors, creating a better end-customer experience and lowering the cost of operations. As also illustrated in diagram 100*b*, based on the SL goals, assignments may be modified, such that agent 110 may pick up a request from queue 106.

In some aspects, a probability that a given higher priority queue may be skipped for agent assignment may be determined and associated with the higher priority queues. In some cases, this probability value may be used to in essence temporarily override the priority value and of a given queue. The probability values may be determined, such as dynamically, per queue, in some cases. In some cases, the probability values may be determined using a control systems approach (e.g., a PID controller or similar technique), or various other methods (such as additive increase multiplicative decrease), to yield increased performance.

In yet some aspects, either in addition to or alternative to using SL goals to modify queue assignments to agents, the described techniques may also modify one or more visibility thresholds of one or more queues to change the assignments to improve request processing. In these cases, the visibility threshold of one or more queues may be modified relative to the configured visibility threshold, such as temporarily, to increase or decrease agent assignments to the affected queues. The amounts by which the visibility thresholds may be changed may be determined, such as dynamically, per queue, in some cases. In some cases, the amounts to modify the visibility thresholds may be determined using a control systems approach (e.g., a PID controller or similar technique), or various other methods (such as additive increase multiplicative decrease), to yield increased performance.

In some aspects, the described techniques may equally be applied to any of different constructs of what defines a queue. In some cases, a queue may simply be defined by one or more skillsets or attributes, such that an agent having the defined one or set of attributes of a given queue can be assigned to that queue (e.g., a proficiency based queue). In some cases, the describes techniques may be advantageously applied to systems implementing proficiency and other types of queues.

Figure 2:
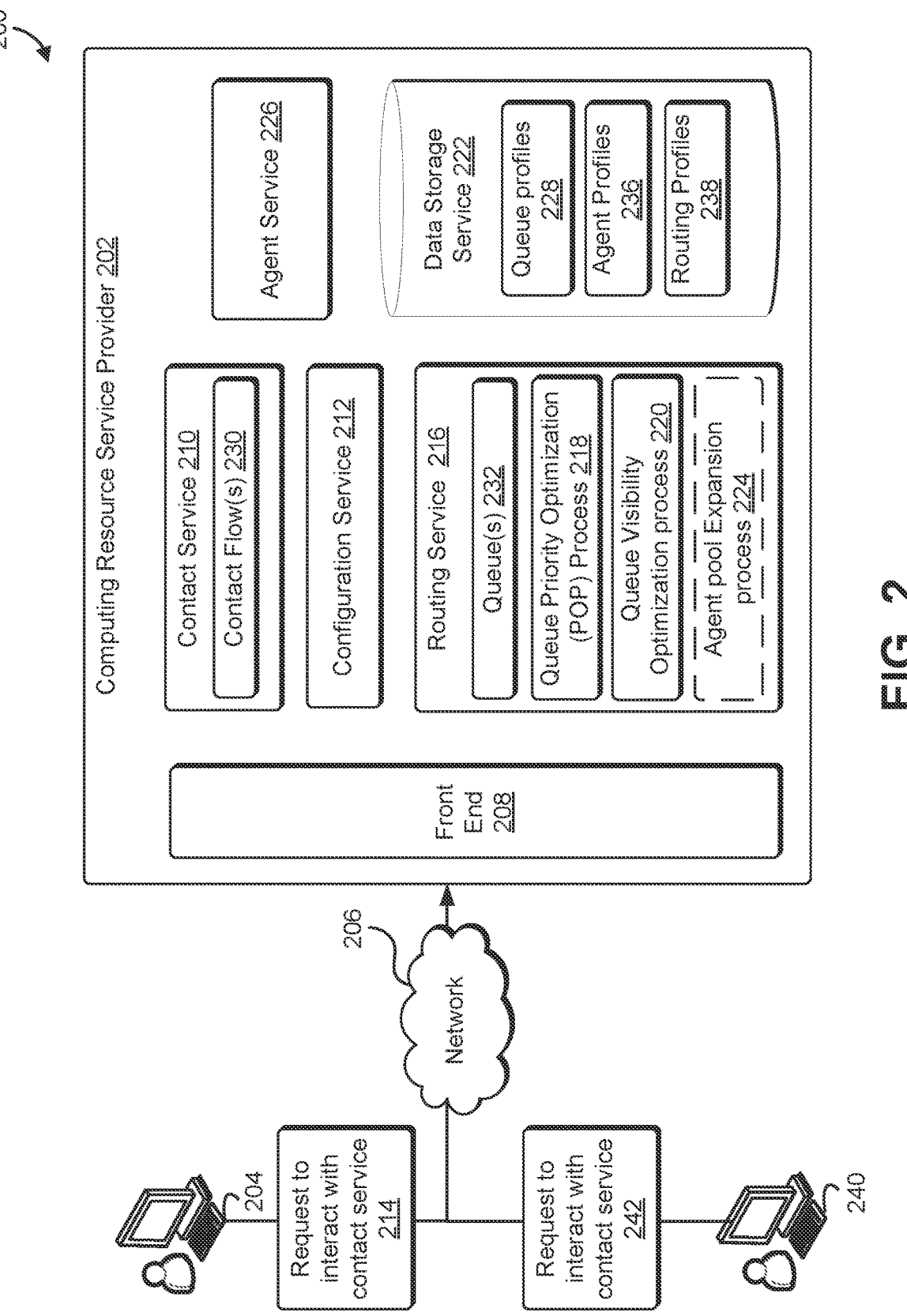
FIG. 2 illustrates an example environment in which the described techniques can be practiced, according to at least one embodiment.

FIG. 2 illustrates an example environment 200 in which a routings service 216 and a contact service 210 may be provided by a computing resource service provider 202. The routing service 216 may interact with various other computer-implemented services, such as one or more of a front end 208, a contact service 210, and/or a data storage service 222 to route customer requests to various queues and assign agents to those queues, as will be described in greater detail below. Various client computing devices 204 may interact with the computing resource service provider 202 through one or more networks 206 to access this functionality.

Client 204 may refer to a client computer system or computing device connected to a server (e.g., computing resource service provider) over a network 206. In some cases, client 204 refers to a user or operator of a client computer system and may be an employee of an organization that utilizes a computing resource service provider 202 to interact with various forms of data, such as through one or more of a routing service 216, front end 208, contact service 210, and/or data storage service 222. In some cases, computing device 204 may be associated with the computing resource service provider 202, such as may be provided by or through a contact service or other computerized service 210. In these cases, the computing device 204 may be operated by a human operator or user, such as may be referred to generally as an agent. In other aspects, the agent may be fully automated, including textual and audio communications (e.g., a bot). In some cases, the agent 204 may access various services and data provided by the computing resource service provider 202 to facilitate resolving issues with external customers, such as may also interact with computing resource service provider 202 via requests 242 through customer device 240, also over a network, such as network 206. For example, an agent 204 may communicate with a customer through the contact service 210 and may access a configuration service 212 in coordination with the contact service 210 to obtain information to help a customer resolve one or more issues with an underlying application or service, such as other 3$^{rd}$ party system or application, including various customer relationship management (CRM) systems.

In some cases, the front end 208 may receive the request 214, 242 and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, devices 204, 240 use client software that is configured to establish a client-server relationship with a service of a computing resource service provider 202. A client 204, 240 may connect to a service via front end 208, which receives requests from clients and routes them to backend services. Front end 208 may interface with one or more of a routing service 216, a contact service 210, and/or a data storage service 222, and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 12. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 222 to store and manage large volumes of data, including text, image, and other data. The data storage service 222 may store various data, such as may be organized into various accounts or profiles. In some aspects, the data storage service 222 may store various data used and/or modified by the contact service 210 and/or routing service 216 to route requests to various queues and modify one or more parameters of different queues captured in queue profiles 228 to improve or optimize throughput of processing requests. In some aspects, the data service 222 may also store routing profiles 238, which may define which agents get assigned to which queues that store requests. A routing profile may define what type(s) of channels the routing profile supports (e.g., one or more of voice, chat, or task), and/or identifiers of queues that are within the routing profile that may be assigned to agents. A routing profile 238 may have a set of queues matched up to one or more channels. Additionally, for each queue-channel combination, there is a priority and visibility threshold (aka delay). In some cases, one queue can also be present in different routing profiles and can have different priority and delay, such that the priority value and delay/visibility threshold are routing profile specific for a given queue.

In some cases, each queue profile may include a name, hours of operation, etc., and in some cases, a time-to-service level (SL) goal. In some aspects, each queue profile may alternatively specify a priority and a visibility threshold. In some aspects, the data storage service 222 may additionally store agent or resource profiles 236. An agent profile 236 may contain various information pertaining to an individual agent, or alternatively a resource, such as may be used by the contact service 210 (or in some cases routing service 216) to pair agents with different routing profiles 238. In some cases, an agent profile 236 may include an indication of proficiency with respect to a certain type of issue (e.g., proficiency level of 4/5 in handling issues relating to a certain type of database), such as may be used to assign a routing profile to an agent (e.g., an agent may be assigned to only one routing profile, while a routing profile may be assigned to multiple agents), and in some cases, may include a routing profile assigned to the agent.

Data storage service 222 may be an on-demand data storage service, such as an object-based data storage service that services API requests to store and retrieve data objects synchronously, and may be configured to store various forms of data and media, and other data structures generated and updated by the contact service 210 and the routing service 216. The data storage service 222 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 222, may be organized into data objects, in one or more logical data containers. The data storage service 222 may include one or more data objects, which may have arbitrary sizes and may, in some instances, have constraints on size. Thus, the data storage service 222 may store numerous data objects of varying sizes. The data storage service 222 may operate as a key value store that associates data objects with identifiers of the data objects which may be used by the routing service 216 and/or the contact service 210 to retrieve or perform other operations in connection with the data objects stored by the data storage service 222. Access to the object-based data storage service 222 may be through application programming interface (API) calls to the service or via an interface, such as a graphical user interface (GUI). Access to the data storage service 222 may be through application programming interface (API) calls to the service, for example from client device 204, 240 directly or through the computing resource service provider 202 and/or front end 208.

It should be appreciated that the data storage service 222 may additionally or alternatively provide non-object-based data storage, such as block data storage, table-oriented data storage, relational databases, file-based storage, and the like. The data storage service 222 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may also provide a contact service 210. The contact service 210 may be a collection of computing resources, including physical resources, virtual resources, or combinations thereof, configured to obtain, direct, and otherwise manage various communications streams from or between various computing devices, such as audio stream between an agent computing device 204 and various customers of the contact service 210, such as through customer computing device 240. In some examples, the contact service 210 may provide automated or partially automated communications to computing devices, such as text or audio communications, to one or more computing devices 204. In some cases, contact service 210 may facilitate establishing and managing communication channels between various computing devices 204, 240. In some cases, the contact service 210 may provide omnichannel communications. For example, text messaging or chat, voice contact, and/or video contact may be dynamically offered, based on such factors as customer preference and estimated wait times. The contact service 210, in some aspects, can integrate with one or more other services, to provide managed communication channels to users of the one or more services.

The contact service 210 may provide for a wide range of communication services to a variety of computing devices. In some examples, the contact service 210 may operate as a contact center, such as for one or more web-based businesses, retailers, etc. In other cases, the contact service 210 may provide communication services to any number of different organizations, such as health related organizations, retail, construction, legal services, etc. It should be appreciated that the techniques described herein have a broad range of applications, and that the above-mentioned use cases are only given by way of example.

In some aspects, the computing resource service provider 202 may also include a configuration service 212. The configuration service 212 may provide a GUI to a computing device 240-(or any user with appropriate permissions via a computing device) associated with the contact service 210, to aid in establishing and managing communication channels with client computing devices 240. In some cases, the configuration service 212 may provide a dashboard to facilitate configuring and accessing customer data, such as one or more profiles linked to a specific customer or account. In yet some cases, the configuration service 212 may provide a means for various agents and other entities associated with the contact service 210 to access routing profiles, queue information, and agent assignments to different queues through one or more routing profiles, as will be described in greater detail below. In some cases, the configuration service 212, which may include a control interface/dashboard to facilitate configuring and managing various communication channels, various contact flows 230, routing profiles, and/or various queues 232. A contact flow 230 may encompass one or more menu options and routing directions (e.g., automated routing instructions) to respond to a customer inquiry, such as may be received from a computing device 204, 240 in the form of a text or audio stream. A contact flow 230 may be contained in a data structure, which is processed when a communication channel is established, and may include different routing instructions (e.g., for directing customer requests to different queues based on any of a number of factors), pointers to different audio recordings, text responses, and the like. In some cases, a contact flow 230 may include one or more automated responses, recorded menu offerings, etc., as will be appreciated by those having skill in the art. The contact service 210 may provide any number of different contact flows 230 to handle various customer inquiries. The configuration service 212 may interact with the contact service 210, the agent service 226, and/or the routing service 216 to enable configuration and management of contact flows, queue profiles, routing profiles, agent profiles, etc. In some alternative cases, the configuration service 212 may be part of one or more of the contact service 210 and/or the routing service 216.

The computing resource service provider 202 may also provide a routing service 216. The routing service 216 may be a collection of computing resources, including physical resources, virtual resources, or combinations thereof, configured to route agents or other resources to queues to process requests. In some cases, routing service may also be configured to modify one or more parameters of different queue profiles 228 and/or routing profiles 238 to improve or optimize agent assignments to the various queues in one or more routing profiles. The routing service may implement one or multiple processes, such as a queue priority optimization process 218 (which may also be referred to as a probabilistic overring of queue priorities process), a queue visibility optimization process 220, and/or an agent pool expansion process 224. From a high level, the process 218 may determine probability values for different queues that are used to determine if an agent will skip that queue for assignment (e.g., will move to a lower priority queue to process a customer request). More details concerning process 218 will be described below in reference to FIGS. 3-6. Process 220, which may in some cases be combined with process 220, includes modifying the visibility threshold values for one or more queues to improve request processing. More details concerning process 220 and 224 will be described below in reference to FIGS. 7-11.

In some examples, priority and visibility thresholds for queues are linked or associated with routing profile(s). In some cases, there can be multiple routing profiles with same or different set of queues with different set of priority and visibility thresholds. For example, a routing profile P1 may have the following queues with corresponding priorities and visibility thresholds: Q1: priority 1, visibility threshold 5 s; Q2: priority 2, visibility threshold 10 s; Q3: priority 3, visibility threshold 20 s. Another routing profile P2 may have share some of the queues with P1, but with different priority and/or visibility threshold values: corresponding priorities and visibility thresholds: Q2: priority 1, visibility threshold 15 s; Q1: priority 2, visibility threshold 20 s; Q4: priority 3, visibility threshold 10 s. In some cases, P1 may end up updating the probabilities or visibility thresholds different from P2. In other words, the priority values and/or visibility thresholds for a given queue in a routing profile may be independent from the priority values and/or visibility thresholds for the same queue in a different routing profile.

In some cases, the routing service 216 may also provide a number of different queues 232, to which issues and/or action items (e.g., generally referred to herein as requests) may be assigned. A queue 232 may be a storage location where an item or data structure is placed, typically temporarily, to be processed at a later time. The various queues 232 may be linked or associated with one or more contact flows 230, such that an action item may be placed in an appropriate queue 232 based on the action that needs to be taken to resolve or close the action. In some cases, the action to be taken may also correspond to a contact flow 230. In other cases, the contact service 210 itself may provide and/or manage the queues 232. In some cases, a queue 232 may be configured using the configuration service 212 (e.g., using one or more APIs in the control plane), where the actual queues 232 are maintained inside the routing service 216, such that when the contact service 210 routes a particular request through a contact flow 230 to a given queue 232, it calls an API on the routing service 216 to enqueue the request in the specified queue 232.

Figure 3:
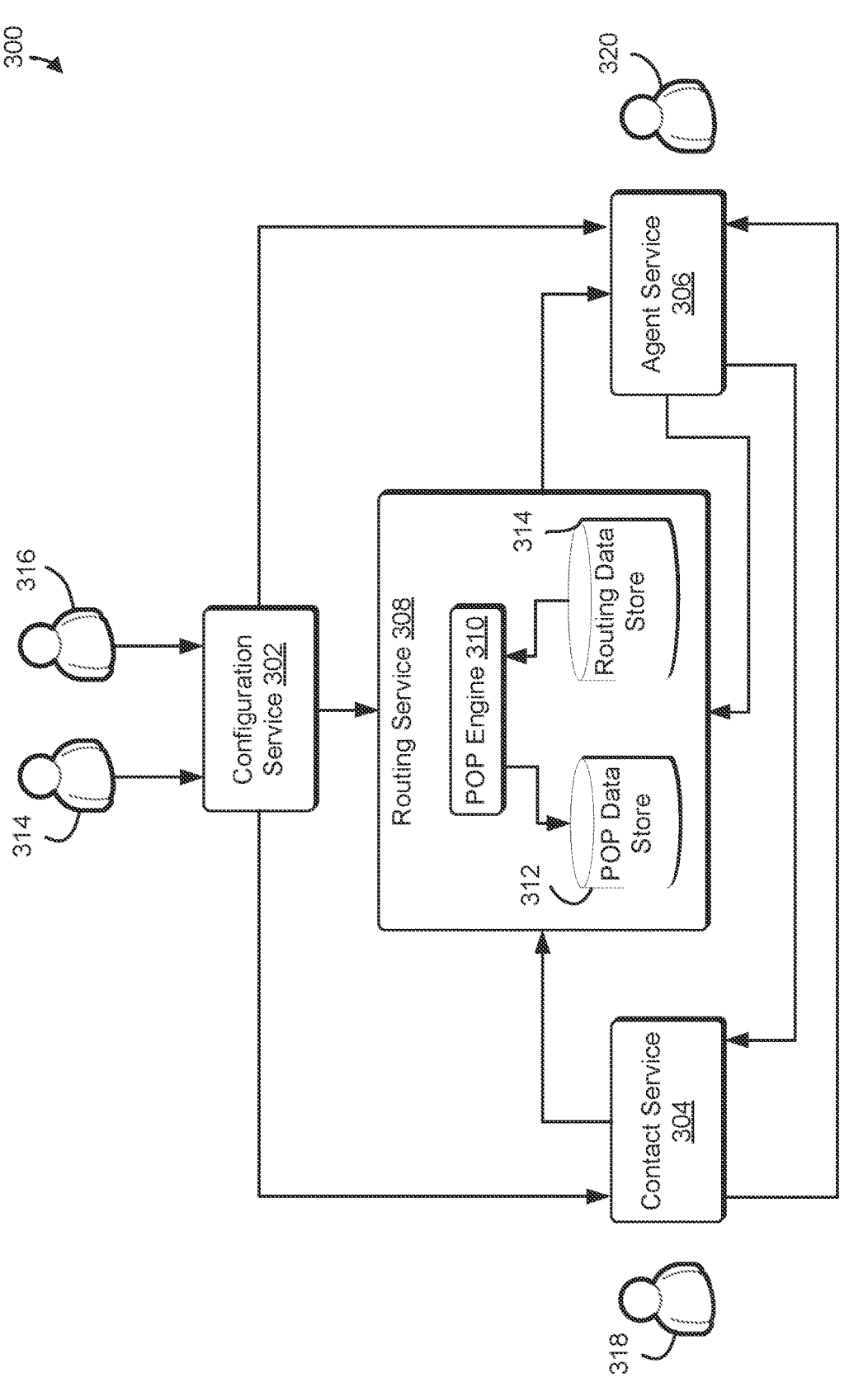
FIG. 3 illustrates an example routing service implementing probabilistic overriding of queue priorities, according to at least one embodiment.

FIG. 3 illustrates an example diagram 300 of an environment including a routing service 308 in which the described techniques can be practiced, according to at least one embodiment. As illustrated, customers 318 may interact with the contact service 304, which may be an example of contact service 210 described above in reference to FIG. 2. Contact service 304 may manage a number of queues for storing and processing customer requests. A routing service 308, which may be an example of routing service 216 described above in reference to FIG. 2, may route customer's requests, received by the contact service 304 to be connected with different agents 320 via an agent side service 306. In some cases, agent side service 306 may be provided by the contact service 304.

In some aspects, the routing service 308 may provide APIs to update availability of agents and contacts, and is responsible for matching contacts to the appropriate available agents. The matching may be based on agent profiles, routing profiles, and queue profiles as described above in reference to FIG. 2. In some examples, a configuration service 302, which may also be provided by the contact service 304, may enable administrators/developers to configure various parameters of the routing service 308, via API calls. In some cases, this may include setting or modifying one or more of a priority value, a visibility threshold, and/or a SL goal of one or more queues. In yet some cases, the configuration service may provide one or more user interfaces for displaying or otherwise presenting or transmitting performance metrics of various queues, and/or viewing modifications made to the queue parameters such as skip probability values, modified visibility thresholds, and so on.

As illustrated, the routing service 308, in some cases, may include a Probabilistic Overriding of queue Priorities (POP) engine 310, which may implement POP process 220 described above in reference to FIG. 2. In some cases, the POP engine 310 may be a skewness removal engine that enables a contact center or service 304 to achieve a reasonable distribution of agents across queues within a given routing profile based on the SL goal and current SL performance. In some cases, the POP engine 310 may initiate over-performing queues (e.g., exceeding their relative SL goals) to dynamically donate some agents to serve the traffic in under-performing queues. The POP engine 310 may determine one or more skip probability values for these overperforming queues, and store them in a POP data store 312, which may in some cases be provided by the data storage service 222. An agent visiting a queue in their routing profile can choose to ignore visiting the contacts in that queue with a certain probability and visit the next lower-priority queue instead. In some cases, the POP engine 310 may obtain queue profile information and/or routing profile information from the routing data store 314, which may in some cases be provided by the data storage service 222. More detailed processes of determining skip probability for various queues to increase queue/request processing throughput will be described in greater detail below.

Figure 4:
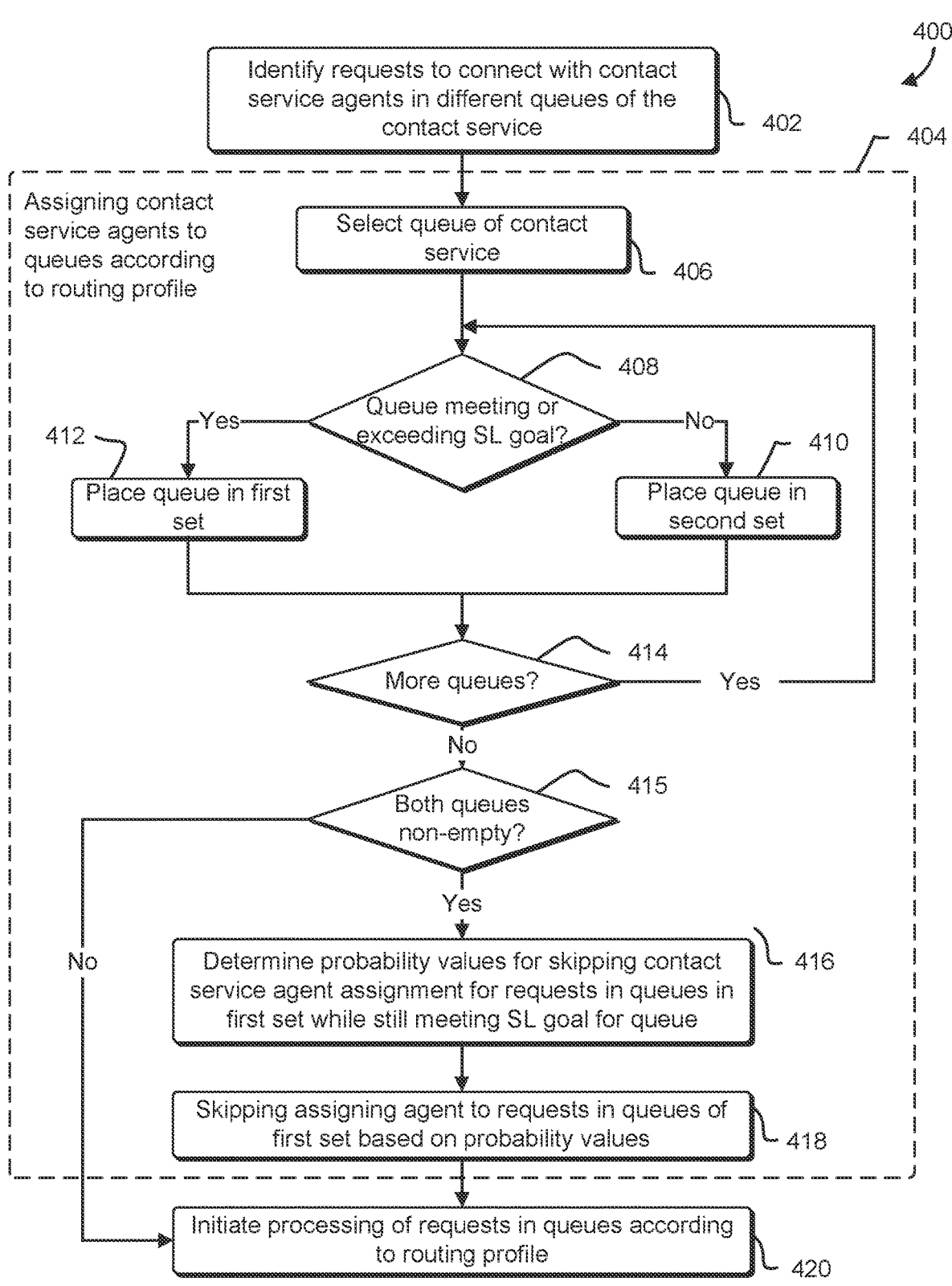
FIGS. 4-6 illustrate example processes for changing priorities of queues, according to at least one embodiment.

FIG. 4 illustrates an example process 400 for determining skip priorities for overperforming queues, such as may be performed by the routing service 216, 308, and/or the POP process 218/POP engine 310 described above.

In the detection phase, a POP process or engine may detect if there is any skewness in the queues of the routing profile. In this phase, the POP engine may first identify requests in a number of different queues of a contact service at operation 402. The POP engine may then select a queue, at operation 404, and compare an SL goal of the queue to an actual performance SL of the queue to determine if it exceeding its SL goal, at operation 408. Based on this comparison, the POP engine may divide the queues in the routing profile into two disjoint sets: a first overperforming set or $Q_o$, e.g., a set of queues that are meeting or overperforming with respect to their respective SL goal, and a second set or $Q_u$, e.g., a set of queues that are underperforming with respect to their respective SL goal, at operations 412 and 414. The POP engine may continue to cycle through all relevant queues (e.g., in a given routing profile) via operations 414, 406, 408, 410, and 412, until there are no more queues to analyze. In some cases, if (e.g., and only if) the POP engine detects that both $Q_o$ and $Q_u$ are non-empty sets, it concludes that there is a skewness in the routing profile and moves to the computation phase. Otherwise, it may simply mark the entire run complete.

In the computation phase, at operation 416, the POP engine calculates the values of probabilities with which a queue can be ignored without degrading its performance beyond its SL goal. In some examples, this may include the POP engine analyzing the routing profile and creating a probability vector $[p_1, p_2, p_3, \ldots, p_N]=[0, 0, 0 \ldots 0]$ After this, in every run (e.g., when at least part of process 400 is performed again upon detection of a triggering event (e.g., change in routing profile) or periodically (e.g., at little as every 30 seconds, or varying amounts of time greater than 30 seconds), the POP engine may look at the current performance of the queues with respect to its SL goal. If the performance is still skewed, then for each of the queue, it computes the error as $e(t)=SL(t)-SL_{goal}$. Using that error $e(t)$, it computes the probability $x(t)=f(e(t))$ In some aspects, obtaining a closed form expression of $x(t)$ may be difficult and/or very labor intensive, particularly given the large number traffic patterns supported by a single contact service/routing profile.

In the execution phase, these calculated probabilities are used by the agents to actually ignore the queues, such as at operation 418. In the routing loop, the queues in the routing profile of an agent will still be visited in the order of the priority in the routing profile configuration. For every queue $q_i$, an agent will ignore iterating through its contacts with probability $p_i$ and jump to $q_{i+1}$. In some aspects, process 400 may additionally include initiating processing requests in the queues of the routing profile according to the routing profile and the assignments. In some cases, when process 400 is being performed iteratively/periodically, operation 420 may be ongoing, such that agents are assigned to different queues on an ongoing basis.

Figure 5:
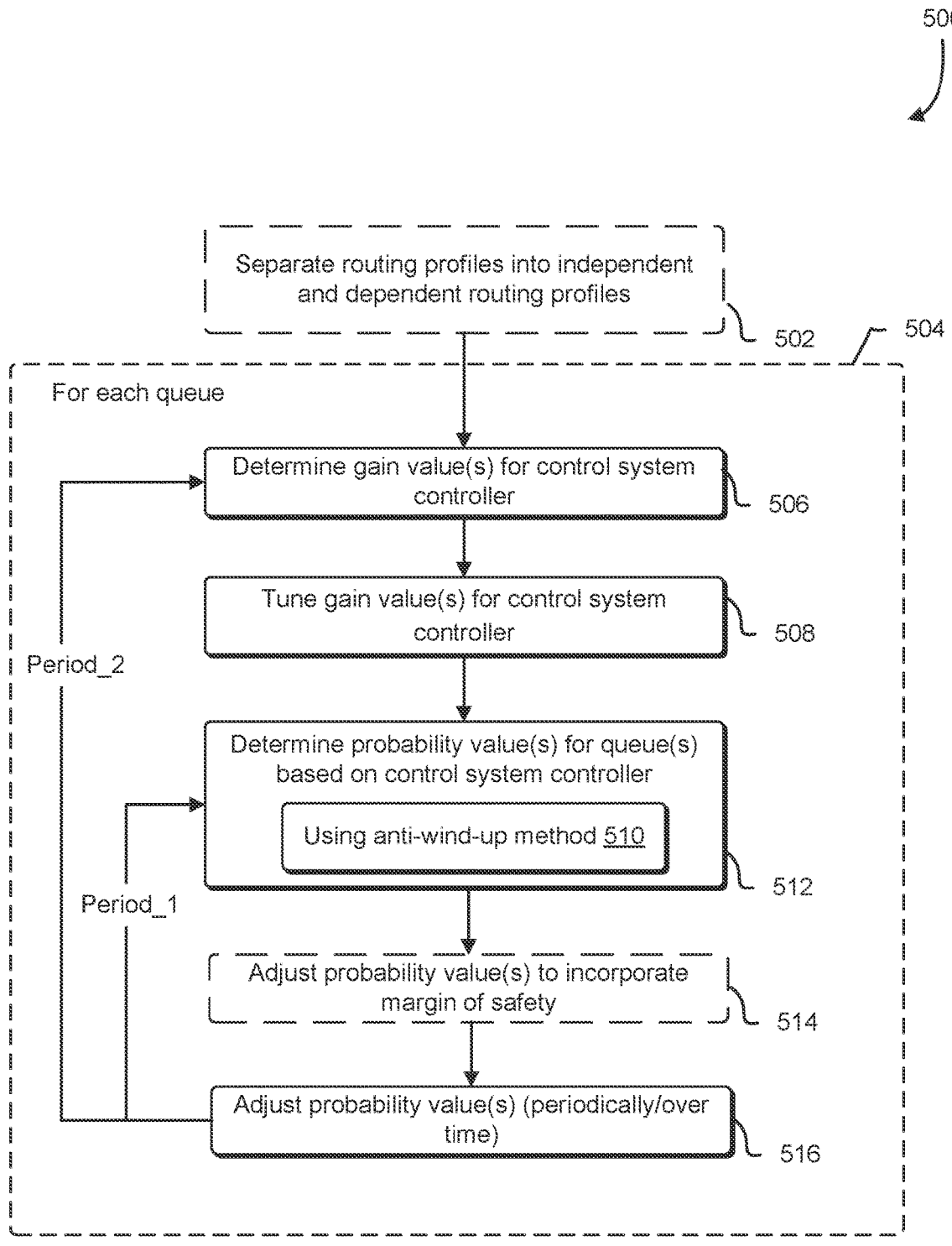

FIG. 5 illustrates another example process 500 for determining skip probabilities for overperforming queues, such as may be performed by the routing service 216, 308, and/or the POP process 218/POP engine 310 described above. In some aspects, process 500 may be a more detailed example of operations 418 described above in reference to process 400. Process 500 may illustrate an example of using a control systems approach or technique, such as a using a PID controller. However, it should be appreciated that any of a number of different control system type techniques may be similarly utilized.

In some examples, a PID controller (or a P or PI controller) based approach may be utilized using the constant gains $K_p$ (proportional gain), $K_d$ (derivative gain), $K_i$ (integral gain), where t is time (e.g., in seconds), e(t) is an error function, (e.g., e(t)=SL(t)–Sl$_{goal}$ as defined above), such as provided by the equation below:

$$x(t) = K_p * e(t) + K_d * \frac{d(e)(t))}{dt} + K_i * \int_0^\tau (e(t)dt$$

In some examples, the current set of probabilities queues may be [p1, p2, p3 . . . , pN]. The POP engine can then update these and the resultant vector will look like [$p_1$, $p_2$, $p_3$, . . . , $p_N$]=[$x_1(t)$, $x_2(t)$, $x_3(t)$, . . . , $x_N(t)$].

In some cases, a contact service may support thousands of contact centers with thousands of queues and routing profiles Therefore, thousands of control systems may be executed, one for each queue in each routing profile collectively spitting out a vector of probabilities for a vector of queues in the routing profile. In the example above, the control systems for queues of an example routing profile collectively spit out [$p_1$, $p_2$, $p_3$, . . . , $p_N$]=[$x_1(t)$, $x_2(t)$, $x_3(t)$, . . . , $x_N(t)$].

While running these control systems in a distributed system is overly difficult, each of these control systems may be tuned separately. On one band, some of these control systems are going to be independent. For example, the ones corresponding to different contact centers or the ones for routing profiles that contain disjoint set of queues even if they are in the same contact center. On the other hand, some of these control systems are going to be non-independent. For example, the control systems for routing profiles that share queues. Therefore, it may be impossible to manually come up with a set of gains $K_p$, $K_d$, $K_i$ that will be appropriate for every control system.

Therefore, an automated heuristic method of tuning, such as the Ziegler-Nichols method, or other similar method may be utilized. As contact center configuration, traffic, and hence the queue behavior can potentially change dramatically, control system gains may need to be regularly computed. In some cases, one or more of the gains may be revaluated periodically, such as every 1, 5, 10, 15, 30, minutes, for example, as well as on every routing profile configuration change.

The probability values must stay within [0, 1]. As the error e(t) may still be present, the integral component and hence the overall value of x(t) will continue to rise. In some cases, the final value of pi may be capped to fall within [0, 1]. As the error e(t) may still be present and constant, the integral component and hence the overall value of x$_i$(t) will continue to rise. While this does not create a problem immediately, as the final value may be capped, this can create a problem if for any reason this queue becomes an under-performing queue. This is because the value of x$_i$(t) would have become so high, that it will take time before the final value starts decreasing. Therefore, in some cases, an anti-windup technique or component may be implemented in the integral component.

For anti-windup, clamping, back calculation, or an observer approach may be utilized, to name a few examples. Instead of capping the value of p$_i$, the value may be capped at the value of x$_i$(t) itself to fall in [0, 1] and then two checks may be performed. First the value of x$_i$(t) may be compared with the capped value. If the values are equal then there was no saturation, but if the values are not equal then it means that there was a saturation. A second check can include comparing the sign of the controller x$_i$(t) with the sign of the error e(t). If the first check indicates there is saturation and the second check indicates that signs of x$_i$(t) and e(t) are same, then it means that the integral component is making things worse, and the integral component should be switched off, else the integral component is helping and it should stay switched on.

Returning specifically to process 500, first the routing profiles may be separated into groups of dependent routing profiles at operation 502. In some cases, routing profiles that have disjoint set of queues may be considered independent. For example: P1: {Q1, Q2, Q3} and P2: {Q4, Q5, Q6} are independent. Routing profiles that have overlapping set of queues are dependent. For example: P1: {Q1, Q2, Q3} and P2: {Q2, Q3, Q4}. Changes in queues in dependent routing profiles, then, may impact one another. In some cases, operation 502 may be optional. The remainder of process 500, captured in operations 506-516 may then be performed for each group of routing profiles (or in some cases, for dependent set of queues (or for each independent queue) identified in the groups of routing profiles). Effectively, certain groups of routing profiles have only one routing profile because that routing profile is independent of others. Certain groups have more than one dependent routing profiles. In some cases, for each group, one routing profile may be selected (e.g., in a round-robin fashion or based on some other type of selection method), and the control system(s) for the queues in that routing profile may be determined. In other cases, operations 506-516 may be performed for some or all of the routing profiles irrespective of whether they are dependent on other routing profiles or not.

The gain values for each queue for the given control system may then be determined (in some case using an approximate or heuristic technique), at operation 506, such as via the techniques described above. In some cases, a P, a PI, a PID, or other control system algorithm or technique may be utilized, where the corresponding gain value(s) may be determined at operation 506. One or more of the gain values may be tuned for each iteration, at operation 508, such as via known control system techniques, In some cases, this may include selecting gain values and then iterating over small adjustments to the gain values to determine an acceptable error value.

Next, the probability values for a given queue/group of dependent queues may then be determined using the determined gain values in the control system/algorithm, at operation 512. In some cases, anti-windup may also be implemented in this operation, as indicated at sub-operation 510. In some cases, a margin of safety may be factored in at this stage, to adjust the probability value. Determining a margin of safety will be described in greater detail below. The probability values may then be periodically adjusted over time at operation 516, such as by looping back through processes 512-514. In some cases, one or more probability values may be adjusted more frequently, such as based on a first period, whereas the control system gain value may also be recomputed or adjusted, but based on a different (e.g., longer) period.

In some cases, a margin of safety may be determined according to one or more of the following techniques. In one example, assume that the routing profile has only two queues $P=\{q_1, q_2\}$, where $q_1$ is over-performing with respect to its SL goal and $q_2$ is under-performing with respect to its SL goal. If $q_2$ has a huge average handle time (AHT) (time to assign the issue/request and/or resolve it) compared to $q_1$, it can lead to permanent loss of agents. If an agent skips $q_1$ with a certain probability so that they can take contacts from $q_2$, then that agent may never come back to $q_1$. Similarly, many agents will move to taking contacts from $q_2$. If at any point, enough agents skipped $q_1$ such that $q_1$ is no longer outperforming its SL goal, its skip probability value will reduce to 0 and no more agents will go to handle contacts from $q_2$. This situation may be acceptable however, if the traffic in q1 suddenly increases, it will start underperforming. The skip probability is already 0 but the agents are stuck in handlings high AHT contacts from $q_2$.

The same can happen for VTO process as will be described in greater detail below. Although increasing the visibility thresholds does stop, the agents who went on to handle contacts from $q_2$ are stuck handling those contacts due to high AHT. Similarly, now if the traffic in q1 suddenly increases, it will start underperforming. Even if the visibility threshold is reduced back to zero, many agents are stuck in handlings high AHT contacts from $q_2$.

To reduce this risk, the concept of a margin of safety may be utilized. Instead of stopping to increase the skip probability to zero only when there is no gap between the current SL and target $SL_{goal}$, the POP engine can do that as soon as current $SL<=(1+M)*SL_{goal}$ where M is a margin of safety. Similarly, instead of stopping to increase the visibility threshold only when there is no gap between the current SL and target $SL_{goal}$, VTO can do that as soon as current $SL<=(1+M)*SL_{goal}$ where M is a margin of safety. In other words, instead of considering the provided $SL_{goal}$ as the target for our over-performing queues, $(1+M)*SL_{goal}$ may be considered the target in the described control systems.

Fixed margin of safety: The simplest way is to choose an arbitrary 10% margin of safety. If the SL goal for q1 is 90% of contacts should be handled in less than or equal to 5 seconds, a margin of safety of 10% would mean that we shall ensure that skip probability of q1 is such that 90% of contacts should be handled in less than or equal to 4.5 seconds. As a result of this margin of safety, we'll be able to absorb a sudden increase in q1 traffic up to a certain extent without letting its current SL fall below its target SL. While this is easy to implement, the 10% margin of safety may be too much in a few cases and too small in others.

Figure 6:
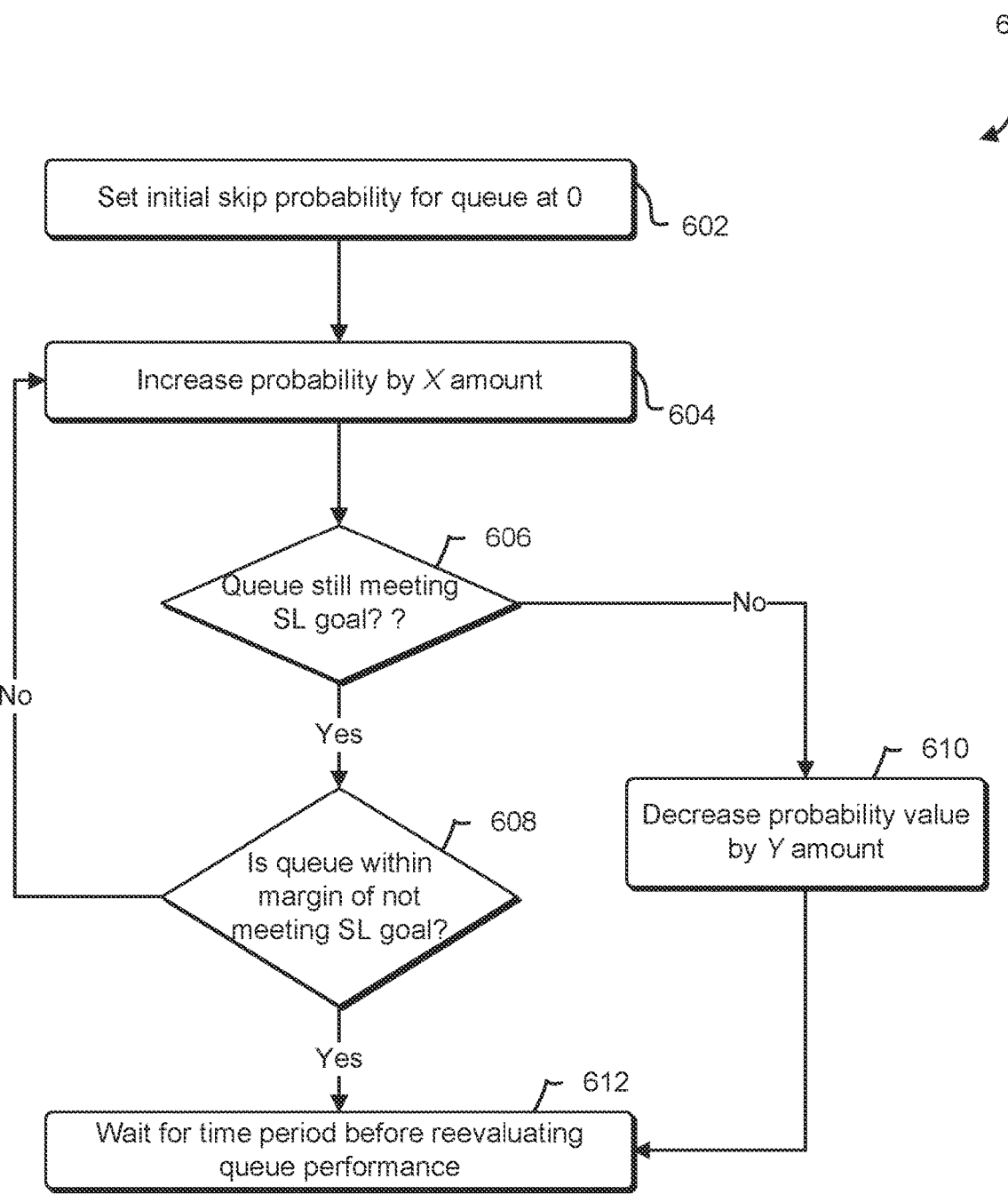

Dynamic margin of safety: The fact that agents move from $q_1$ to $q_2$ very slowly means that the margin of error is limited to a scenario in which the traffic in $q_1$ increases by the time agents are done handling contacts in $q_2$. So if the last agent who skipped the queue $q_1$, started handling a contact in $q_2$, then how much time the agent is expected to take may be estimated. For this estimate, the queue level distribution of handle time may be used; instead of using the average value, the first standard deviation over the average may be used to be more conservative. Another approach to estimate the handle time would be to use machine learning regression techniques using features like queue level statistics, agent attributes, contacts attributes, etc. If the agent is expected to take H minutes, it may be useful to forecast how much the traffic will increase in the next H minutes. If the traffic is forecasted to increase by $\Delta$, then the margin of safety will be a function of $\Delta$. For example:

M=min (100, max (0, $K\Delta$)) where K is a constant in the range. This implies that:

1. If $K\Delta>100$, then the margin of safety M=100%
2. If $K\Delta<=0$, then the margin of safety M=0%
3. If $0<K\Delta<100$, the margin of safety $M=K\Delta$ FIG. 6 illustrates another example process 600 for determining skip probabilities for overperforming queues, such as may be performed by the routing service 216, 308, and/or the POP process 218/POP engine 310 described above. In some aspects, process 600 may be a more detailed example of operations 418 described above in reference to process 400.

In some cases, it may be advantageous to not absolutely eliminate the over-performance, e.g., adjust the over-performing queue to its SL goal. Instead, in some cases, it may be beneficial to reduce the over-performance so that more and more number of agents are available to handle contacts from one or more under-performing queues. Therefore, more error may be tolerated than provided by a control system A more probing based approach may be beneficially utilized, in some cases, such as Additive Increase and Multiplicative Decrease (AIMD). The values of probabilities lie between 0 and 1. For example, for an over-performing queue, the probability may be initialized at 0 for a given queue, at operation 602. The probability may then be increased by a predetermined amount, such as represented by X (e.g., 0.01) at operation 604. Once the queue probability has been increased, it may be tested to determine if the queue is still meeting its SL goal, at operation 606. If it is, then in some cases, it may be determined if the queue is meeting the SL goal with some buffer or margin built in, at operation 608. In some cases, operations 606 and 608 may be combined into a single operation (such that operation 606 may be skipped). In some cases, if the SL performance of the queue is not within a margin of safety of its SL goal, then process 600 may loop back to operation 604 to continually increase/decrease (e.g., tune) the skip probability of the queue.

If the queue SL performance is too close to the SL goal, as determined at operation 608, then process 600 may proceed to operation 612, where process 600 may delay for a time period before reevaluating queue performance, at which time process 600 may restart for the given queue (e.g., loop back to operation 606). In some cases, a queue may be determined to not be meeting its SL goal, such as at operation 606. At that point, the value of probability may be reduced by an amount Y (e.g., 10% or other configurable amount), at operation 610, until the queue is back to meeting its SL goal. As illustrated, after operation 610, process 600 may continue to operation 612, at which point a time period may pass before the queue performance is retested, at which point process 600 may restart at operation 606.

In other words, for routing profiles where skewness is detected, for the queues in $Q_o$, the probability values are increased in increments X (e.g., 0.01) periodically while for the queues in $Q_u$, the probability values are decreased by Y (e.g., 10%) periodically. The period in both cases may be kept the same (e.g., 30 seconds) to ensure simplicity. In some cases, optionally, it may be determined if the queue is within a margin of safety of the meeting the SL goal, such as at operation 608, if not then the probability may continue to be increased, at operation 604.

Figure 7:
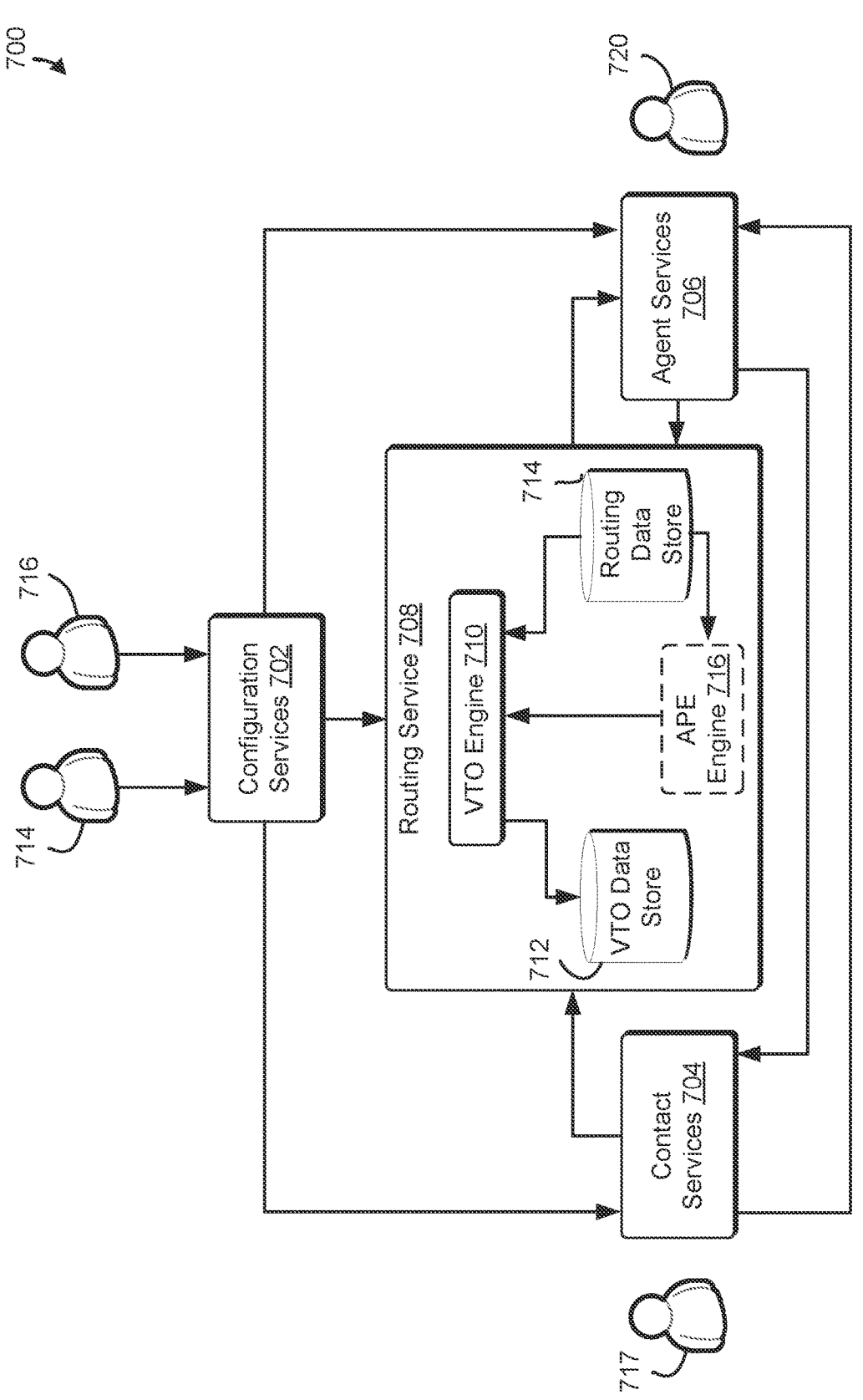
FIGS. 7-8 illustrate examples of a routing services implementing visibility threshold adjustments, according to at least one embodiment.

FIG. 7 illustrates an example diagram 700 of an environment including a routing service 708 in which the described techniques can be practiced. Diagram 700 may include various similar components and services as described above in reference to diagram 300 of FIG. 3, with the primary difference being the routing service 708 implementing a VTO engine 710 in place of a POP engine. For the sake of brevity similar components providing similar functions will not be described again here. In some aspects, environment 700 may share one or more aspects with or may be an example of or provided by the computing resource service provider 202 described above in reference to FIG. 2.

As illustrated in FIG. 7, routing service may additionally or alternatively implement a visibility threshold optimization (VTO) engine 710. VTO engine may be a skewness removal engine, which modifies the visibility thresholds of various queues (instead of modifying priorities, as performed by the POP engine described in other examples) In some aspects, both the POP engine and the VTO may work or operate together to provide the various benefits and advantages described heroin. In some cases, advantages of tweaking the visibility thresholds may include introducing a deterministic additional delay on requests waiting in various queues. Similar to the POP engine described above, the VTO engine 710 enables contact centers to achieve a reasonable distribution of agents across queues within their routing profile based on the SL and current performance.

Similar to the POP techniques described above, the VTO engine 710 may cause the over-performing queues to dynamically donate some agents to serve the traffic in under-performing queues. Instead of agents probabilistically ignoring taking contacts from an over-performing queue, the VTO engine 710 increases the visibility threshold of the over-performing queues so that requests wait in queue for a little longer, such that agents are available to handle contacts from under-performing queues. Similarly, the VTO engine 710 may decrease the visibility thresholds of underperforming queues. In some cases, both techniques may be implemented concurrently. In one example, the VTO engine 710 may identity the or a subset of the most overperforming queues (e.g., queues exceeding their respective SL goals by the greatest margin) and increase the visibility threshold by a first amount. In another example, the VTO engine 710 may identity the or a subset of the most underperforming queues (e.g., queues not meeting their respective SL goals by the greatest margin) and decrease the visibility threshold by a second amount. In some cases, each visibility threshold may be modified by a different amount, such as may be determined based on the difference between the SL goal and the current performance of the queue, the current value of the visibility threshold, number of the queues in a given routing profile, and various other factors using various computational techniques.

In some cases, the VTO engine 310 may obtain queue profile information and/or routing profile information from the routing data store 714, which may in some cases be provided by the data storage service 222. In some cases, the VTO engine 310 may alternatively obtain queue profile information and/or routing profile information from the configuration service 212, as described above. The VTO engine 710 may similarly store calculated visibility thresholds in a VTO data store 712, such as may be provided by the data storage service 222. More detailed processes of determining modifications to visibility threshold for queues to increase queue/request processing throughput will be described in greater detail below.

Approaches mentioned above, both skip probability and visibility threshold adjustments address the service level skewness by tweaking bow agents in a certain routing profile prioritize contacts in the queues of that routing profile. These approaches may reduce the likelihood of requests or queues breaching their SL, but in a contact surplus contact centers, it may still be impossible to eliminate that if there is a sudden increase in traffic in a certain queue and therefore the queue is indeed understaffed. Currently, administrators try to address this by reactively adding understaffed queues in more existing routing profiles where the agents are already trained to handle that queue or creating a new routing profiles with this queue and bring some agents over there. However this manual process can be quite labor intensive and lack accuracy, especially in light of quickly changing traffic patterns.

In some cases, this problem may be addressed by configuring one or multiple stand-by routing profiles, that are configured with one or more queues, that may only be active or visible if one or a threshold number of SL goals for the one or more queues are being breached. These standby queues may not specify or be associated with a visibility threshold or an infinite visibility threshold (such that the routing profile will not direct agents to pick up requests from that queue). The routing service 708 may treat these queues with infinite visibility threshold, as may be implemented by an optional agent pool expansion (APE) engine 716. Upon determining that a queue is in distress (e.g., not meeting its SL goal for a configurable time period), the APE engine 716 may then reduce the visibility threshold of that queue in the standby routing profile(s) from infinity to the time part of the SL goal. Effectively, this process creates standby routing profiles for a queue. In some cases, a single standby routing profile may be configured with multiple queues, such that it can operate as a standby for all the queues associated with it (e.g., but possibly not all at the same time to an equal degree). In some cases, multiple standby routing profiles may be created, such as with queues that historically have become overloaded or are predicted to become overloaded. In other cases, a standby routing profile may be associated with one of these queues (e.g., expected to become overloaded) and a number of other queues that are not expected to become overloaded, thus reducing the overhead of having a large number of backup routing profiles (e.g., one per active queue), while still offering a higher likelihood of being able to handle a large percentage of overload conditions within a certain amount of time.

In some cases, as soon as the APE engine 716 detects that one or more queues are breaching their SL goals, it can reduce the visibility threshold of the same queue or queues in a standby routing profile to the time part of the SL goal (e.g., 90% of contacts should be handle within 15 seconds, so visibility threshold becomes 15 seconds). As soon as this happens, agents of the standby routing profile may start handling requests from this queue and the understaffing issue may be more adequately addressed. After this process is completed, the VTO engine 710 may adjust visibility thresholds of the queue(s) in the standby routing profile to balance the SL goals. In yet some cases, the standby routing profiles) may be implemented by the VTO engine 710. In these scenarios, the visibility threshold value of a queue in its "standby routing profiles" may be set to the time part of SL goal from the beginning of the current process. In some aspects, the AP engine 716 may be similarly implemented with the POP engine 310 as part of routing service 308 described above in reference to FIG. 3 above, to a similar effect.

For example, a routing profile can be active for a certain queues while standby for others, such as in the following set of queues in routing profiles P1 and P2. Routing profile P1 may have the following queues: Q1: priority=1, visibility threshold=10 s; Q2: priority=2, visibility threshold=15 s; Q3: priority=2, visibility threshold=Infinity. Routing profile P2 may have the following queues: Q3: priority=1, visibility threshold=0 Q4: priority=2, visibility threshold=10 s. Profile P1 is active for Q1 and Q2 and hence its agents are handling requests from Q1 and Q2, but it is standby for Q3 and hence, they are not handling requests from Q3. Profile P2 is active for Q3. If at some point, performance of Q3 deteriorates, the APE engine 716/VTO engine 710 will change the visibility threshold of Q3 in P1 to be lower (e.g., the time part of the SL goal for Q3). At that point, agents of P1 will also start handling contacts from Q3. At that point, in some cases, the VTO engine 710 may kick in and further fine tune the visibility threshold of Q3 in P1.

Figure 8:
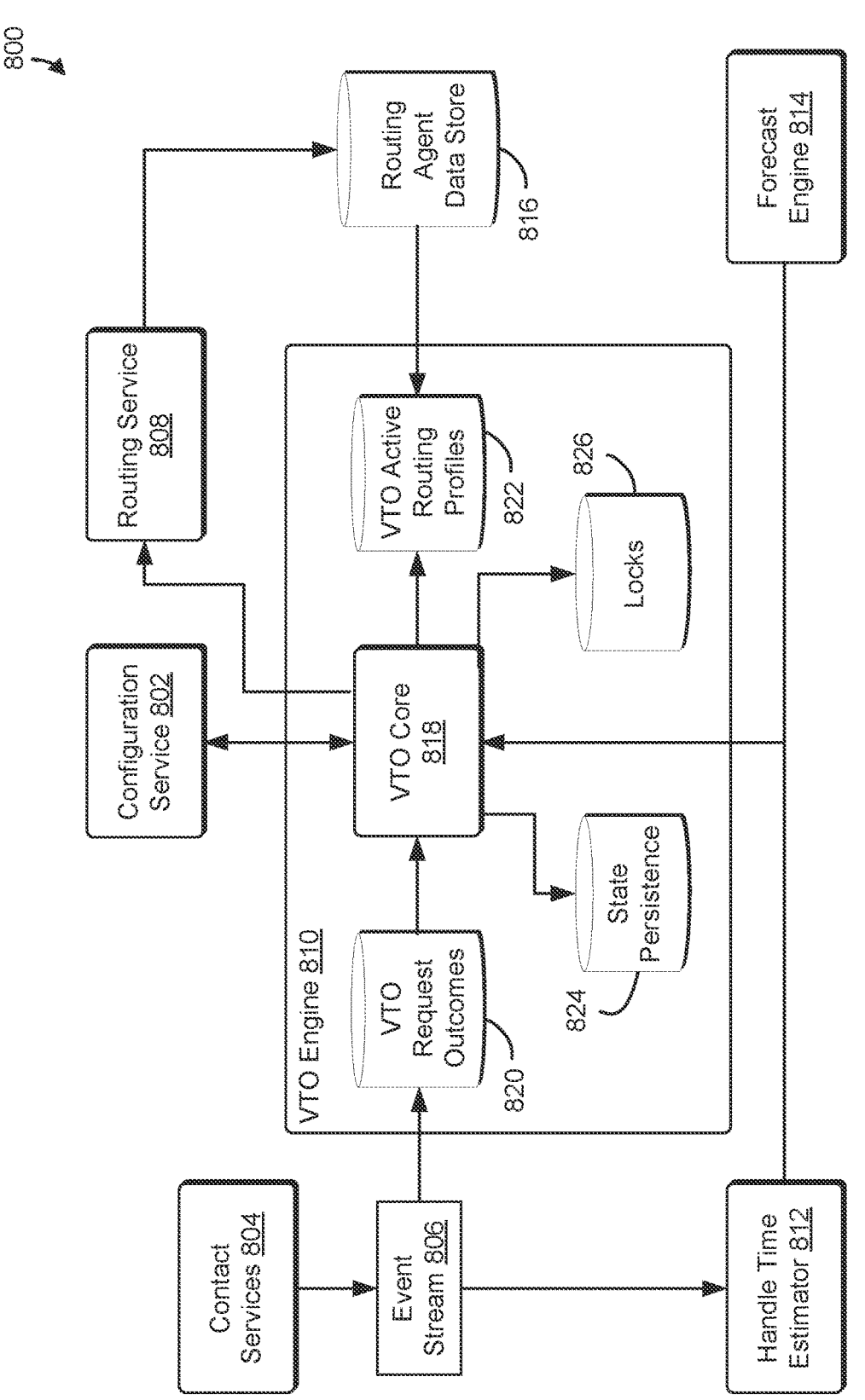

FIG. 8 illustrates another example of a routing service 808 interacting with a visibility threshold engine 810. In some aspects, routing service 808 and VTO engine 810 may be an example of routing service 708 and VTO engine 710 described above.

In some aspects, the routing service 808 is responsible for using the output of VTO engine 810, currently enqueued requests, and currently available agents to match agents with the requests Not all agents are available all the time and hence not all routing profiles may be active. Therefore, either routing service 808 can pull the VTO engine 810 output periodically for active routing profiles or the VTO engine 810 can periodically push its output to the routing service 808. In some cases, the latter may be preferable, as while the VTO engine 810 will have to maintain which routing profiles are active based on the change event stream from routing agent data store 816, it gives the VTO engine 810 the power to control the frequency of data push (e.g., it can push as soon as the data changes instead of letting routing service 808 pull vigorously).

In some cases, VTO engine 810 can maintain its own store of currently active routing profile and outcomes of requests, in the respective VTO requests outcomes data store 820 and the VTO active routing profiles data store 822. At any point of time, a routing profile may be owned by a computing instance (virtual machine) or software container of the VTO engine 810. This may be determined by dividing routing profiles into X number of buckets (e.g., 1000) and then having one a software container of compute instance utilize a lock from lock data store 826 on the bucket. In some instances, no software container or compute instance will be able to grab more than Y number of buckets (e.g., 250 buckets).

In some examples, for an active routing profile, the corresponding compute instance/software container may periodically check the request outcomes from the VTO request outcomes data store 820 of all the queues inside the routing profile and divide them into outperforming and underperforming sets $Q_o$ and $Q_u$ respectively. If both are non-empty then this goes to the computation stage as described above. After computation, the VTO engine 810/ instance of the VTO engine may send the visibility threshold vector to routing service 808.

Figure 9:
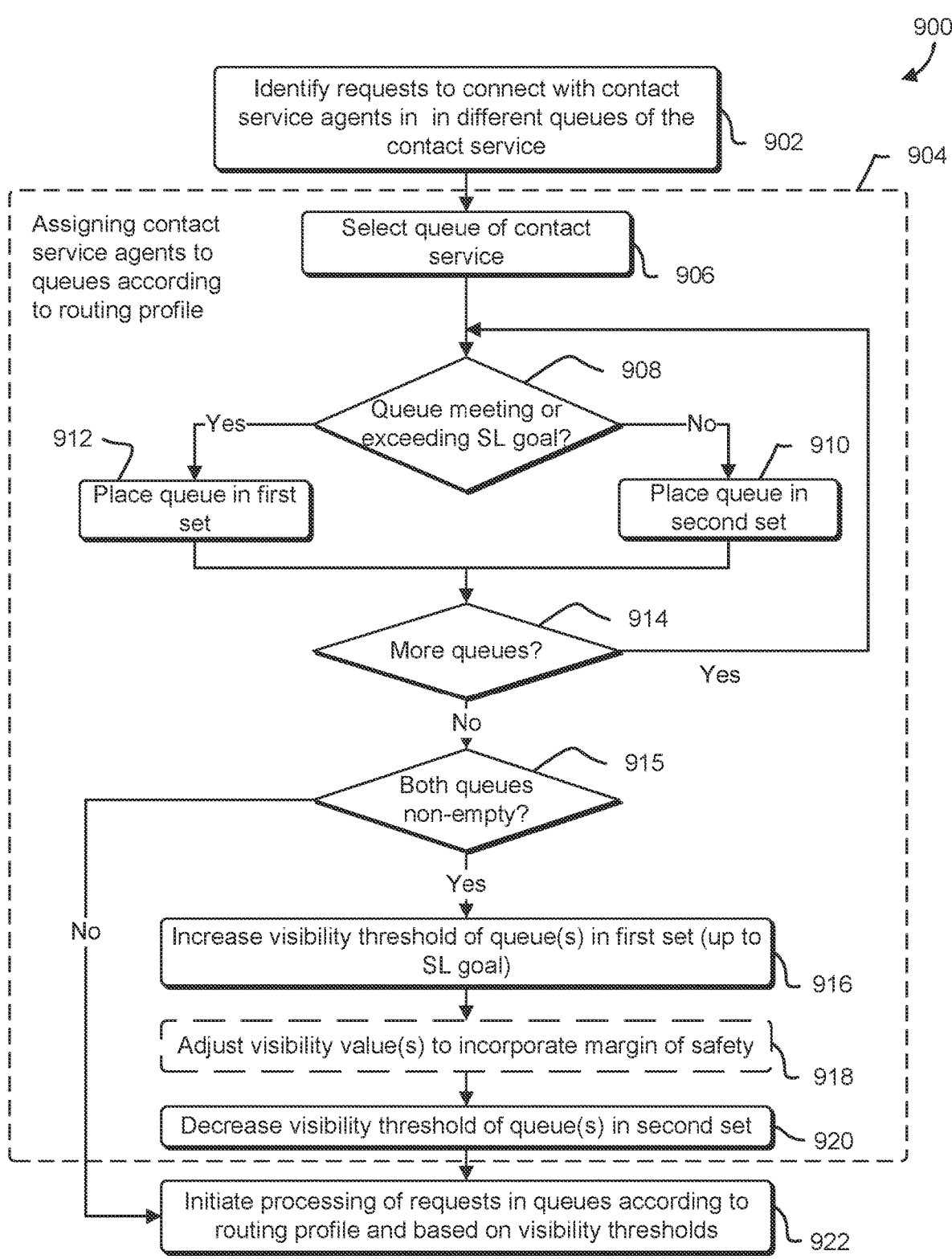
FIGS. 9-11 illustrate example processes for changing visibility thresholds of queues, according to at least one embodiment.

FIG. 9 illustrates an example process 900 for changing visibility thresholds of queues, such as may be performed by the routing service 216, 308, and/or the VTO process 220 and/or VTO engine 710, 810 and/or APE engine 716 described above. Process 900 may have three phases detection, computation, and execution.

In the detection phase, the VTO engine may detect if there is any skewness in an queues of the routing profile (similar to operations 402-414 described above in reference to FIG. 4). In this phase, the VTO engine may first identify requests in a number of different queues of a contact service at operation 902. The VTO engine may then select a queue, at operation 904, and compare an SL goal of the queue to an actual performance SL level of the queue to determine if it exceeding its SL goal, at operation 908. Based on this comparison, the VTO engine may divide the queues in the routing profile into two disjoint sets: a first overperforming set or $Q_o$, e.g., a set of queues that are meeting or overperforming with respect to their respective SL goal, and a second set or $Q_u$, e.g., a set of queues that are underperforming with respect to their respective SL goal, at operations 912 and 914. The VTO engine may continue to cycle through all relevant queues (e.g., in a given routing profile) via operations 914, 906, 908, 910, and 912, until there are no more queues to analyzer. In some cases, if (e.g., and only if) the VTO engine detects that both $Q_o$ and $Q_u$ are non-empty sets, it concludes that there is a skewness in the routing profile and moves to the computation phase. Otherwise, it may simply mark the entire run complete.

In the computation phase, the VTO engine may determine an amount to increase the visibility threshold value of one or more queues in the over performing set, at operation 916 and/or determine an amount to decrease the visibility threshold value of one or more queues in the underperforming set, at operation 920. In some cases, one or more of the probability values may be adjusted to incorporate a margin of safety, at operation 918, such as using techniques described above. In some cases, operations 906-920, collectively subprocess 904, may be performed multiple times, such as upon the occurrence of triggering event, such as a change in a related routing profile, periodically, or based on a number of other various factors. At various times (e.g., periodically or after new visibility thresholds have been calculated), the VTO engine may initiate processing the requests based on the routing profile and the one or more modified visibility threshold values for queues in the routing profile, at operation 922.

In some cases, as there may be multiple queues in a routing profile, for every routing profile a vector of visibility thresholds may be given as $[v_t, v_2, v_3, \ldots v_N]$. The problem of determining visibility thresholds may then be a minimization problem where in N dimensions where the objective function is a measure of skewness. The solution is to find an optimal vector such that the skewness is minimal. In some cases, this includes analyzing a routing profile and tweaking the visibility thresholds of the queues in the routing profile so that the skewness reduces. The VTO engine/process may begin with creating a visibility threshold vector, such that includes visibility thresholds provided by the admins at the configuration time. After this, in every run or execution of part or all of process 900. The VTO engine may look at the current performance of the queues with respect to its SL. If the performance is still skewed, then: from the set of queues that are over-performing $Q_o$, it picks up the one that's over-performing by the highest margin and computes the error as $e_{top}(t)=SL(t)-SL_{goal}$. From the set of queues that are under-performing $Q$ u, it picks up the one that's underperforming by the highest margin and computes the error as $e_{bottom}(t)=SL_{goal}-SL(t)$. Using the error $e_{top}(t)$, it computes the delta $x(t)=f(e_{top}(t)$ by which to increment the visibility threshold. Using that error $e_{bottom}(t)$, it computes the delta $y(t)=f(e_{bottom}(t))$ by which to decrement the visibility threshold.

However, in some cases, obtaining a closed form expressions of x(t) and y(t) is intractable given how many different traffic patterns are supported. More detailed examples of how to address this problem will be describe below in reference to FIGS. 10 and 11.

In the execution phase, these calculated visibility thresholds are used for the routing loop, such that requests in an over-performing queue now must wait for an additional x(t) seconds and the contacts in an under-performing queue now has to wait by y(t) fewer seconds.

In some cases, these computed visibility threshold values can be exposed on an administrative interface (e.g., webpage or dashboard) so that admins can see the actual values that routing is using against the configuration values they had provided. For example, admins will see that: although they set the visibility threshold of a certain queue as 0 seconds, internally routing is considering that as 2 seconds because the queue was over-performing. Although they set the visibility threshold of a certain queue as 20 seconds, internally routing is considering that as 18 seconds because the queue was under-performing. These changes can also be vended to with the help of a change stream so that contact center developers can monitor it in an automated fashion and take necessary actions.

Figure 10:
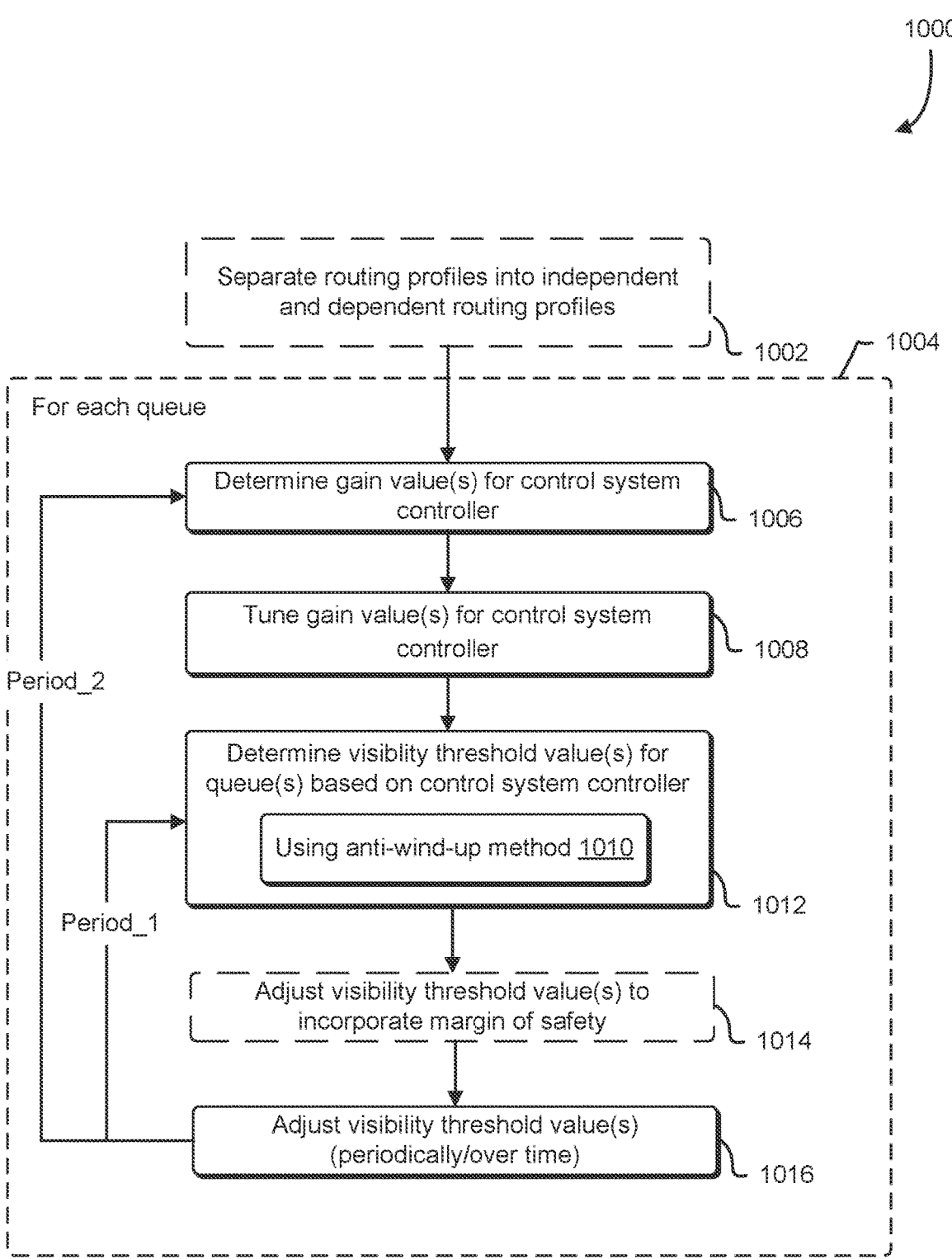

FIG. 10 illustrates another example process 1000 for determining adjustments of visibility threshold values of queues, such as may be performed by the routing service 216, 308, and/or the VTO process 220/APE process 224 and/or VTO engine 710, 810 described above. In some aspects, process 1000 may be a more detailed example of operations 916, 918, and/or 920 described above in reference to process 1000. Process 1000 may illustrate an example of using a control systems approach or technique, such as a using a PID controller. However, it should be appreciated that any of a number of different control system type techniques may be similarly utilized.

In some examples, a PID controller (or P or PI controller) based approach may be utilized using the constant gains $K_p$ (proportional gain), $K_d$ (derivative gain), $K_i$ (integral gain), where t is time (e.g., in seconds), e(t) is an error function, (e.g., e(t)=SL(t)−Sl$_{goal}$ as defined above), such as provided by the equations below:

$$x(t) = K_p * e(t) + K_d * \frac{d(e)(t))}{dt} + K_i * \int_0^t (e(t)dt$$

$$y(t) = K_p * e(t) + K_d * \frac{d(e)(t))}{dt} + K_i * \int_0^t (e(t)dt$$

Suppose $v_{max}$ and $v_{min}$ are the current visibility thresholds of maximally over-performing and maximally under-performing queue, respectively. Then VTO will update these and the resultant visibility threshold vector will look like [$v_1$, $v_2$, $v_3$, . . . , $v_{max}$+x(t), . . . , $v_{min}$−y(t), . . . , $t_N$].

In some cases, a contact service may support thousands of contact centers with thousands of queues and routing profiles. Therefore, running thousands of control systems may be executed, one for each routing profile spitting out a vector of visibility thresholds for each of the queues of the routing profile. While running these control systems in a distributed system is not overly difficult, each of these control systems may be tuned separately. On one hand, some of these control systems are going to be independent. For example, the ones corresponding to different contact centers or the ones for routing profiles that contain disjoint set of queues even if they are in the same contact center. On the other hand, some of these control systems are going to be non-independent. For example, the control systems for routing profiles that share queues. Therefore, it may be impossible to manually come up with a set of gains $K_p$, $K_d$, $K_t$ that will be appropriate for every control system.

Therefore, an automated heuristic method of tuning, such as the Ziegler-Nichols method, or other similar method may be utilized. As contact center configuration, traffic, and hence the queue behavior can potentially change dramatically, control system gains may need to be regularly computed. In some cases, one or more of the gains may be revaluated periodically, such as every 1, 5, 10, 15, 30, minutes, for example, as well as on every routing profile configuration change.

The visibility threshold value must not exceed the delay component of SL$_{goal}$, else queues in $Q_o$ will start underperforming. Therefore, a cap may be placed on the final visibility threshold $V_{cap}$ at a (e.g., much) lower value than SL$_{goal}$. As the error $e_{top}$ may still be present, the integral component and hence the overall value of x(t) will continue to rise. While this does not create a problem immediately, as the final value is capped, this can create a problem if for any reason this queue becomes an under-performing queue. This is because the value of x(t) would have become so high, that it will take time before the final value starts decreasing Therefore, anti-wind-up may be implemented in the integral component, as described above.

Returning specifically to process 1000, in some optional cases, the routing profiles may be separated into groups of dependent routing profiles at operation 1002, similar to operation 502 described above in reference to process 500. The remainder of process 1000, captured in operations 1006-1016 may then be performed for each queue for each group of routing profiles. In other cases, operations 1006-1016 may be performed for some or all of the routing profiles irrespective of whether they are dependent on other routing profiles or not. The gain values for each queue for the given control system may then be determined (in some case using an approximate or heuristic technique), at operation 1006. One or more of the gain values may be tuned for each iteration, at operation 1008, and in some cases, anti-windup may also be implemented in this operation, as indicated at sub-operation 1010.

Next, the visibility threshold values/adjustments to the values for a given queue/may then be determined using the determined gain values in the control system/algorithm, at operation 1012. In some cases, a margin of safety may be factored in at this stage, to adjust the probability value. Determining a margin of safety will be described in greater detail below. The visibility threshold values may then be periodically adjusted over time at operation 1016, such as by looping back through processes 1012-1014. In some cases, one or more visibility threshold values may be adjusted more frequently, such as based on a first period, whereas the control system gain value may also be recomputed or adjusted, but based on a different (e.g., longer) period.

Figure 11:
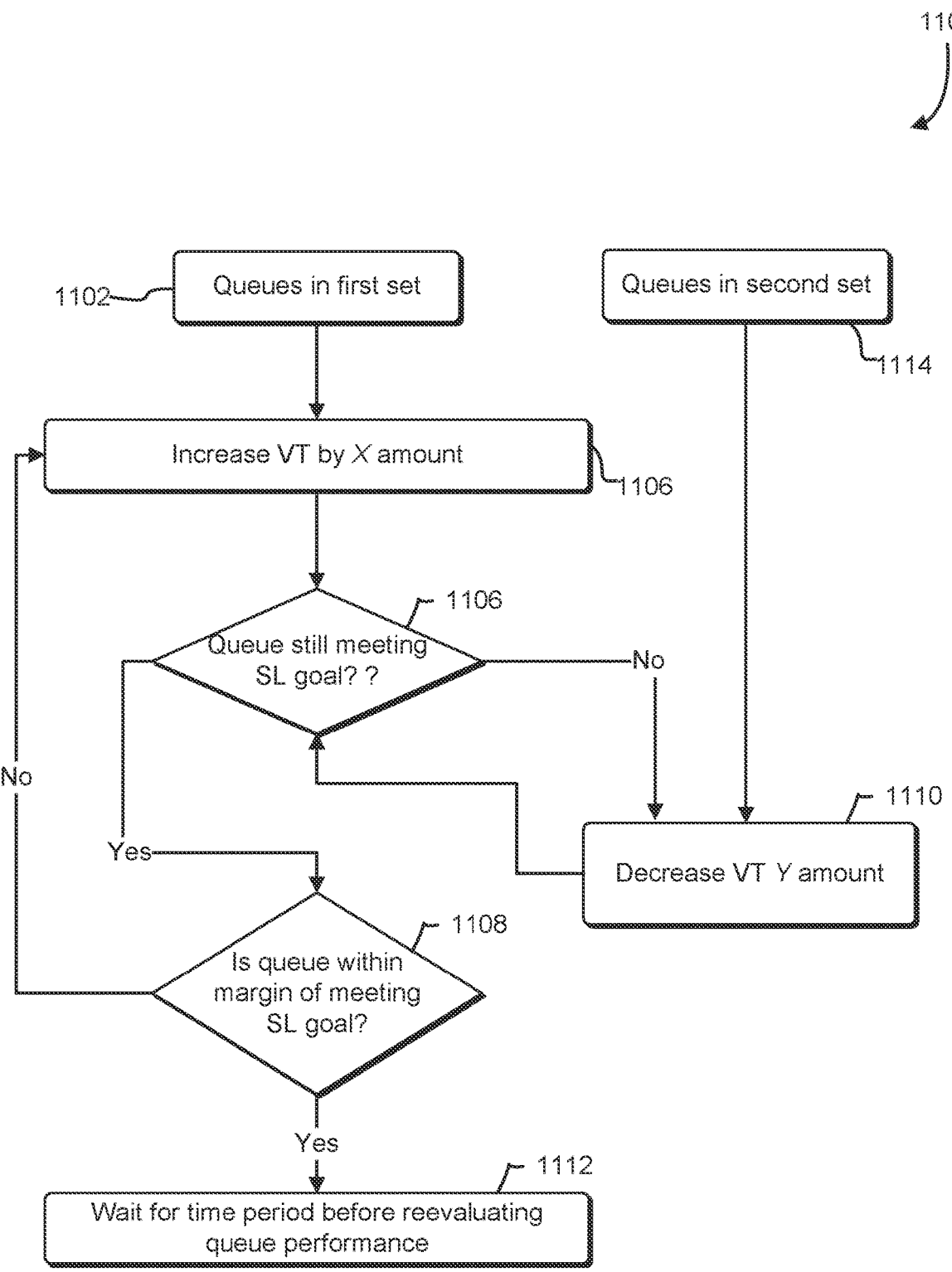

FIG. 11 illustrates another example process 1100 for determining adjustments of visibility threshold values of queues, such as may be performed by the routing service 216, 308, and/or the VTO process 220/APE process 224 and/or VTO engine 710, 810 described above. In some aspects, process 1000 may be a more detailed example of operations 916, 918, and/or 920 described above in reference to process 1000.

It is important to note, that in some cases, the goal may not be to absolutely eliminate the over-performance, such as may include bringing the over-performing queue down to precisely to its SL goal; instead the objective may be to reduce the over-performance so that more and more number of agents are available to handle requests from under-performing queue. Therefore, in some cases, more error can be tolerated than promised by a control system approach. This may allow the use of more probing based approaches, such as Additive Increase and Multiplicative Decrease (AIMD). The values of visibility thresholds lie between 0 and the delay component of $V_{cap}$. This means that for over-performing queues, starting at 0 and in slow increments of $V_{cap}/100$ moving towards $V_{cap}$, at one point a stage is reached when the queue may starts under-performing. At that point, back-off may be implemented to start reducing the value of probability by Y amount (e.g., 10%) unless queue starts over-performing. In other words, for routing profiles where skewness is detected, for the queues in $Q_o$, the visibility threshold increased in increments of $V_{cap}/100$ periodically while for the queues in $Q_u$, the visibility threshold values are decreased by 10% periodically. The period in both cases will be kept the same (say 30 seconds) to ensure simplicity.

An example of a AIMD process may be described in terms of process 1100. At operation 1102, a queue or multiple queues in a first overperforming set may be selected, and the respective visibility threshold may be increased by X amount (e.g., small incremental amount). If the queue is still meeting its SL goal, as determined at operation 1106, process 1100 may proceed to operation 1108, in which it may be determined if the queue is within a margin of safety within its SL goal. If the determination at operation 1108 is negative, then process 1100 may loop back to operations 1106, otherwise process 100 may proceed to operation 1112, in which reevaluation of the performance of the given queue may be delayed for a time period/process 1100 may proceed to a next queue for analysis.

If the queue is not meeting its SL goal, at operation 1106, then process 1100 may proceed to operation 1110, where the visibility threshold may be decreased by Y amount. Then process 1100 may loop back to operation 1106. In some cases, process 100 may also be performed with queues that are in a second set, or underperforming with respect to their SL goals, as indicated at operation 1114. In this scenario, process 1100 may proceed to operation 1110 and continue to loop through the other operations until the queue is within a margin or meeting its SL goal. It should be appreciated that multiple threads of process 1100 may be performed concurrently or in parallel to decrease processing time and to be utilized in a continuous process for monitoring and adjusting queue performance.

Figure 12:
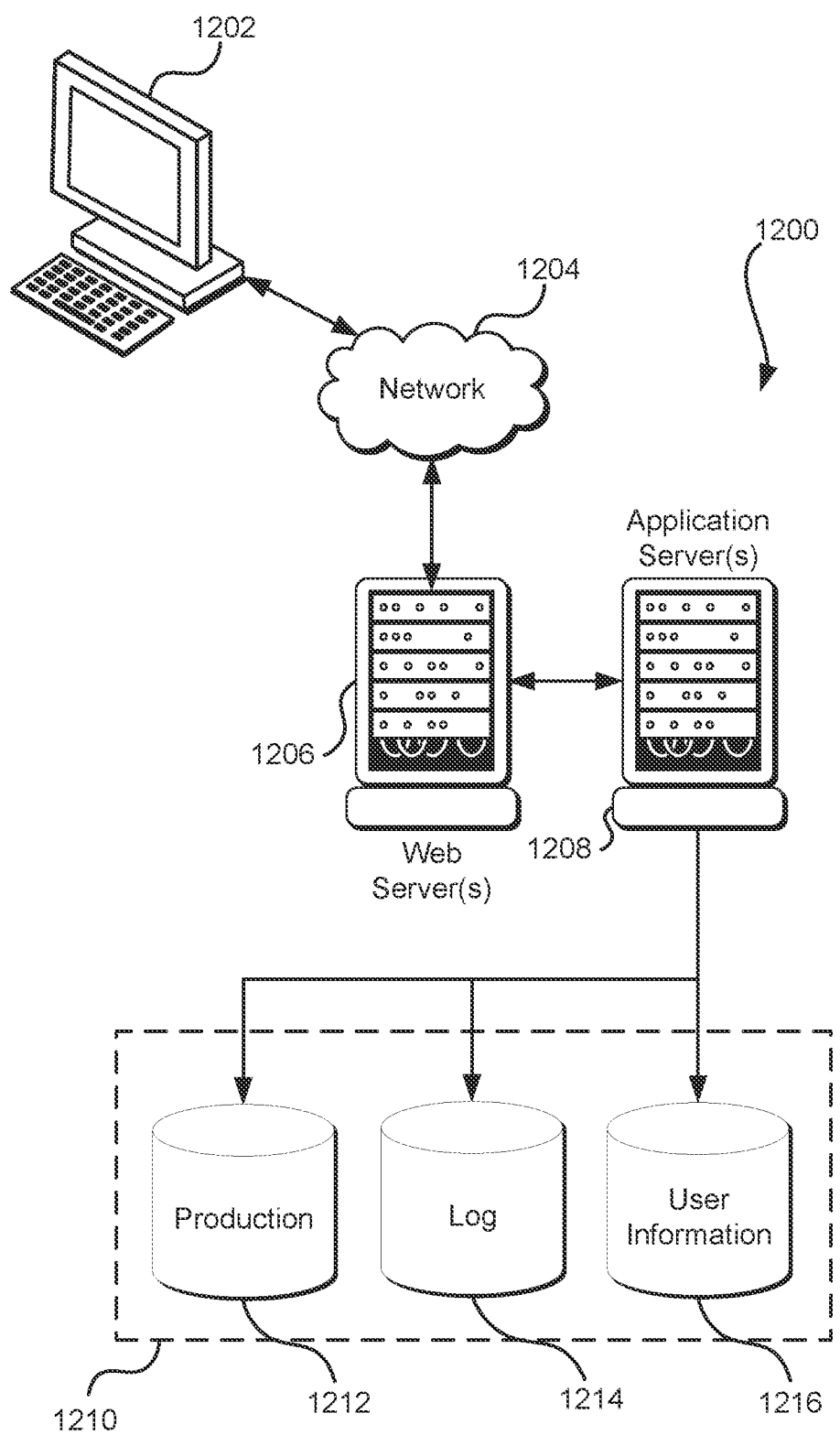
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A computer-implemented method, comprising:

obtaining, by a contact service, a plurality of requests to connect with a contact service agent through the contact service;

allocating, by the contact service, individual requests of the plurality of requests to one of a plurality of queues provided by the contact service based on at least one contact flow;

dynamically modifying, by a routing service, one or more parameters of individual queues of the plurality of queues to which contact service agents are assigned to process the plurality of requests according to routing profiles associated with the contact service agents, wherein the one or more parameters of the individual queues comprise a time-to-service level goal and a priority value for processing individual requests of the plurality of requests, wherein modifying the one or more parameters of the individual queues further comprises, periodically:

grouping at least a first subset of the plurality of queues into a first set of queues based on determining that individual queues of the plurality of queues are exceeding a time-to-service level goal associated with the individual queues;

grouping at least a second subset of the plurality of queues into a second set of queues based on determining that individual queues of the plurality of queues are not meeting a time-to-service level goal associated with the individual queues;

determining skip probability values, using a controller, by which individual queues in the first set of queues can be skipped for contact agent assignment for processing while still meeting the time-to-service level goal associated with the individual queue based on one or more of a proportional factor, an integral factor, and a derivative factor to enable individual queues in the second subset of queues to be assigned a contact service agent, wherein the skip probability values override the priority values associated with the individual queues;

prioritizing assigning contact service agents to requests in queues in the second set of queues over requests in queues in the first set of queues based on the skip probability values and the priority values associated with individual queues of the first set of queues; and assigning, by the contact service, the contact service agents to the individual queues of the plurality of queues to connect the contact service agents with the plurality of requests; and processing the plural of requests with the assigned contact service agents.

2. The computer-implemented method of claim 1, further comprising:

implementing at least one anti-wind-up process for the integral factor of the controller.

3. The computer-implemented method of claim 1, further comprising:

using an automated heuristic method to recompute at least one gain value of the controller based on at least one of time or a change to the routing profile.

4. The computer-implemented method of claim 1, wherein determining the skip probability values by which individual queues in the first set of queues can be skipped for routing agent assignment for processing further comprises:

factoring in a margin of safety to at least one of the skip probability values based on at least one of estimated handle time for requests in other queues of the plurality of queues or traffic forecast data relating to the individual queue.

5. The computer-implemented method of claim 1, further comprising:

based upon determining that both the first set of queues and the second set of queues are non-empty, determining the skip probability values by which individual queues in the first set of queues can be skipped for contact agent assignment.

6. The computer-implemented method of claim 1, wherein individual queues of the plurality of queues are associated with different configurable time-to-service level goals.

7. A system, comprising:

one or more processors;

memory that stores computer-executable instructions that, when executed, cause the one or more processors to:

obtain, by a contact service, an allocation of a plurality of requests to a plurality of queues to be processed by a contact service agent through the contact service; and modify, by the contact service, one or more parameters of individual queues of the plurality of queues to which contact service agents are assigned to process the plurality of requests according to a routing profile, wherein the one or more parameters of the individual queues comprise a time-to-service level goal for processing individual requests of the plurality of requests and a priority value, wherein modifying the one or more parameters of the individual queues further comprises:

determining probability values by which at least a subset of individual queues of the plurality of queues can be skipped for routing agent assignment for processing while still meeting a time-to-service level goal associated with the individual queue to enable individual queues in the plurality of queues that are not in the subset of the individual queues to be assigned a contact service agent, wherein the probability values override the priority value associated with the individual queues; and assigning the contact service agents to a subset of requests of the plurality of requests in the individual queues in the subset of the individual queues, based on the probability values and the priority values associated with the individual queues of the subset of the individual queues, to connect the contact service agents with the subset of requests; and processing the subset of requests with the assigned contact service agents.

8. The system of claim 7, wherein the computer-executable instructions that, if executed, cause the one or more processors to determining the probability values by which at least some individual of the plurality of queues can be skipped for contact service agent assignment for processing further comprises additional computer-executable instructions that, if executed, further cause the one or more processors to:

determine the probability values using at least one control system technique.

9. The system of claim 8, wherein the computer-executable instructions that, if executed, cause the one or more processors to determine the probability values using at least one control system technique further comprises additional computer-executable instructions that, if executed, further cause the one or more processors to:

determine control system variables for individual queues of the subset of queues.

10. The system of claim 7, wherein the computer-executable instructions that, if executed, cause the one or more processors to determine the probability values by which at least some individual of the plurality of queues can be skipped for contact service agent assignment for processing further comprises additional computer-executable instructions that, if executed, further cause the one or more processors to:

determine the probability values using at least one additive increase multiplicative decrease (AIMD) algorithm.

11. The system of claim 7, wherein the computer-executable instructions that, if executed, cause the one or more processors to determine the probability values by which at least some individual of the plurality of queues can be skipped for contact service agent assignment for processing further comprises additional computer-executable instructions that, if executed, further cause the one or more processors to:

account for a margin of safety in determining at least one probability value of the probability values.

12. The system of claim 11, wherein the computer-executable instructions that, if executed, cause the one or more processors to determine the probability values by which at least some individual of the plurality of queues can be skipped for contact service agent assignment for processing further comprises additional computer-executable instructions that, if executed, further cause the one or more processors to:

determine a margin of safety in determining at least one probability value of the probability value based on at least one of estimated handle time for requests in at least one other queue in the plurality of queues or traffic forecast data relating to the individual queue.

13. The system of claim 7, wherein the computer-executable instructions that, if executed, cause the one or more processors to determine the probability values by which at least some individual of the plurality of queues can be skipped for contact service agent assignment for processing further comprises additional computer-executable instructions that, if executed, further cause the one or more processors to:

dynamically recalculate the probability values for individual queues of the subset of queues periodically.

14. The system of claim 7, wherein the memory stores additional computer executable instructions that, if executed, further cause the one or more processors to:

group at least a subset of the plurality of queues into a first set of queues based on determining that individual queues of the plurality of queues are meeting or exceeding a time to service level goal associated with the individual queues, wherein determining probability values by which at least some individual of the plurality of queues can be skipped for contact service agent assignment for processing while still meeting a time-to-service level goal associated with the individual queue is performed for the first set of queues.

15. One or more non-transitory computer-readable storage media storing thereon executable instructions that, as a result of being executed by one or more processors of a computer system, cause the computer system to at least:

obtain an allocation of a plurality of requests to a plurality of queues to be processed by a contact service agent through a contact service;

modify one or more parameters of individual queues of the plurality of queues to which contact service agents are assigned to process the plurality of requests according to a routing profile, wherein the one or more parameters of the individual queues comprise a time-to-service level goal and a priority value for processing individual requests of the plurality of requests, wherein modifying the one or more parameters of the individual queues further comprises, periodically:

grouping at least a first subset of the plurality of queues into a first set of queues based on determining that individual queues of the plurality of queues are exceeding a time-to-service level goal associated with the individual queues;

grouping at least a second subset of the plurality of queues into a second set of queues based on determining that individual queues of the plurality of queues are not meeting a time to-service level goal associated with the individual queues;

determining probability values by which individual queues in the first set of queues can be skipped for contact service agent assignment for processing while still meeting the time-to-service level goal associated with the individual queue to enable individual queues in the second subset of queues to be assigned a contact service agent, wherein the probability values override the priority value associated with the individual queues; and delaying assigning contact service agents to some requests of the plurality of requests in queues in the first set of queues based on the probability values and the priority values associated with individual queues of the first set of queues; and connecting contact service agents with the plurality of requests to process the plurality of requests after a period of delay.

16. The one or more non-transitory computer-readable storage media of claim 15, wherein the instructions further include instructions that cause the computer system to:

determine the probability values by which individual queues in the first set of queues can be skipped for contact service agent assignment for processing while still meeting the time-to-service level goal associated with the individual queue using at least one control system technique.

17. The one or more non-transitory computer-readable storage media of claim 16, wherein the instructions further include instructions that cause the computer system to:

determine control system variables for individual queues of the first set of queues.

18. The one or more non-transitory computer-readable storage media of claim 15, wherein the instructions further include instructions that cause the computer system to:

adjust the probability values by which individual queues in the first set of queues can be skipped for contact service agent assignment for processing while still meeting the time-to-service level goal associated with the individual queue based on detecting a change in at least one routing profile that at least in part defines routing for at least a subset of the plurality of queues.

19. The one or more non-transitory computer-readable storage media of claim 15, wherein the instructions further include instructions that cause the computer system to:

determine a margin of safety in determining at least one probability value of the probability value based on at least one of estimated handle time for requests in at least one queue in the plurality of queues or traffic forecast data relating to the individual queue.

20. The one or more non-transitory computer-readable storage media of claim 15, wherein the instructions further include instructions that cause the computer system to:

increase the probability value for individual queues of the first set of queues periodically at a slower rate than decreasing the probability value to reduce a likelihood of the individual queue not meeting the time-to-service level goal.

* * * * *